(12) United States Patent
Manolakos et al.

(10) Patent No.: US 11,523,364 B2
(45) Date of Patent: Dec. 6, 2022

(54) COMPUTATION COMPLEXITY FRAMEWORK FOR POSITIONING REFERENCE SIGNAL PROCESSING

(71) Applicant: QUALCOMM Incorporated, San Diego, CA (US)

(72) Inventors: Alexandros Manolakos, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 16/991,920

(22) Filed: Aug. 12, 2020

(65) Prior Publication Data

US 2021/0051622 A1 Feb. 18, 2021

(30) Foreign Application Priority Data

Aug. 13, 2019 (GR) .............................. 20190100354

(51) Int. Cl.
*H04W 64/00* (2009.01)
*H04W 24/10* (2009.01)
*H04W 8/24* (2009.01)

(52) U.S. Cl.
CPC ............. *H04W 64/00* (2013.01); *H04W 8/24* (2013.01); *H04W 24/10* (2013.01)

(58) Field of Classification Search
CPC ..... H04W 24/10; H04W 48/12; H04W 64/00; H04W 8/24

(Continued)

(56) References Cited

U.S. PATENT DOCUMENTS 6,728,522 B1 * 4/2004 Marrah ................. H03J 1/0075
455/150.1
7,376,430 B2 5/2008 Matsuda
(Continued)

FOREIGN PATENT DOCUMENTS

EP 2797347 A1 10/2014

OTHER PUBLICATIONS

"3rd Generation Partnership Project; Technical Specification Group Radio AccessNetwork; Evolved Universal Terrestrial Radio Access (E-UTRA); LTE PositioningProtocol (LPP) (Release 15)". 3GPP Standard, Technical Specification, 3GPP TS 36.355, 3rd Generation Partnership Project (3GPP), Mobile Competence Centre, 650, Route Des Lucioles, F-06921, Sophia-Antipolis Cedex, France vol. RAN WG2. No. V15.4.0, Jun. 28, 2019 (Jun. 28, 2019), pp. 1-222, XP051754439, [retrieved on Jun. 28, 2019] Subsections 5.1, 5.2, 6.5.1.7, 6.5.1.8.

(Continued)

*Primary Examiner* — Joseph Arevalo
(74) *Attorney, Agent, or Firm* — Muncy, Geissler, Olds & Lowe, P.C.

(57) ABSTRACT

Disclosed are techniques for wireless communication. In an aspect, a user equipment (UE) sends, to a network entity, a report indicating positioning capabilities of the UE, the positioning capabilities indicating a number of positioning calculations that the UE can perform per unit of time, per unit of frequency, or both, and performs a first set of positioning-related measurements of a set of positioning reference signal (PRS) resources and reports a second set of positioning-related measurements based on the reported positioning capabilities of the UE, the set of PRS resources to be used for the first and second sets of positioning-related measurements, a set of reporting parameters, an accuracy (Continued)

configuration, a latency configuration, or any combination thereof.

48 Claims, 16 Drawing Sheets

(58) Field of Classification Search
USPC .......... 455/404.2, 456.1, 561, 522; 370/330, 370/478, 241, 329, 336
See application file for complete search history.

(56) References Cited

U.S. PATENT DOCUMENTS

| | | | |
|---|---|---|---|
| 8,954,068 B2 | 2/2015 | Edge et al. | |
| 9,002,354 B2* | 4/2015 | Krishnamurthy | G01S 1/30 455/435.1 |
| 9,204,418 B2 | 12/2015 | Siomina et al. | |
| 9,756,599 B2 | 9/2017 | Fischer | |
| 9,964,626 B2 | 5/2018 | Kim et al. | |
| 10,212,688 B2 | 2/2019 | Xiao et al. | |
| 10,256,957 B2 | 4/2019 | Park et al. | |
| 10,264,397 B2 | 4/2019 | Davydov et al. | |
| 10,856,252 B2 | 12/2020 | Han et al. | |
| 2013/0195258 A1* | 8/2013 | Atef | H04M 3/51 379/265.09 |
| 2017/0164225 A1* | 6/2017 | Yu | H04W 24/10 |
| 2018/0098300 A1* | 4/2018 | Venkatraman | H04W 24/02 |
| 2018/0324738 A1* | 11/2018 | Stirling-Gallacher | G01S 5/0036 |
| 2019/0037338 A1* | 1/2019 | Edge | H04W 4/20 |
| 2020/0333427 A1 | 10/2020 | Hu et al. | |
| 2020/0389766 A1* | 12/2020 | Kim | H04L 5/0048 |
| 2021/0297216 A1* | 9/2021 | Shreevastav | G01S 1/20 |

OTHER PUBLICATIONS

International Search Report and Written Opinion—PCT/US2020/046238—ISA/EPO—dated Oct. 29, 2020.

* cited by examiner

ND PROCESSING

COMPUTATION COMPLEXITY FRAMEWORK FOR POSITIONING REFERENCE SIGNAL PROCESSING

REFERENCE SIGNAL PROCESSING

The present Application for Patent claims priority under 35 U.S.C. § 119 to Greek Patent Application No. 20190100354, entitled "COMPUTATION COMPLEXITY FRAMEWORK FOR POSITIONING REFERENCE SIGNAL PROCESSING," filed Aug. 13, 2019, assigned to the assignee hereof, and expressly incorporated herein by reference in its entirety.

BACKGROUND OF THE DISCLOSURE

1. Field of the Disclosure

Aspects of the disclosure relate generally to wireless communications and the like.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes sending, to a network entity, a report indicating positioning capabilities of the UE, the positioning capabilities indicating a number of positioning calculations that the UE can perform per unit of time, per unit of frequency, or both, receiving a request to perform a first set of positioning-related measurements and to report a second set of positioning-related measurements that are associated with a set of positioning reference signal (PRS) resources to be used for the first and second sets of positioning-related measurements, a set of reporting parameters to be used for the reporting, an accuracy configuration, a latency configuration, or any combination thereof, and performing the first set of positioning-related measurements of the set of PRS resources and reporting the second set of positioning-related measurements based on the reported positioning capabilities of the UE, the set of PRS resources to be used for the first and second sets of positioning-related measurements, the set of reporting parameters, the accuracy configuration, the latency configuration, or any combination thereof.

In an aspect, an apparatus for wireless communication includes a transceiver of a UE configured to: send, to a network entity, a report indicating positioning capabilities of the UE, the positioning capabilities indicating a number of positioning calculations that the UE can perform per unit of time, per unit of frequency, or both, receive a request to perform a first set of positioning-related measurements and to report a second set of positioning-related measurements that are associated with a set of PRS resources to be used for the first and second sets of positioning-related measurements, a set of reporting parameters to be used for the reporting, an accuracy configuration, a latency configuration, or any combination thereof, and perform the first set of positioning-related measurements of the set of PRS resources and report the second set of positioning-related measurements based on the reported positioning capabilities of the UE, the set of PRS resources to be used for the first and second sets of positioning-related measurements, the set of reporting parameters, the accuracy configuration, the latency configuration, or any combination thereof.

In an aspect, an apparatus for wireless communication includes means for sending, to a network entity, a report indicating positioning capabilities of the UE, the positioning capabilities indicating a number of positioning calculations that the UE can perform per unit of time, per unit of frequency, or both, means for receiving a request to perform a first set of positioning-related measurements and to report a second set of positioning-related measurements that are associated with a set of PRS resources to be used for the first and second sets of positioning-related measurements, a set of reporting parameters to be used for the reporting, an accuracy configuration, a latency configuration, or any combination thereof, and means for performing the first set of positioning-related measurements of the set of PRS resources and reporting the second set of positioning-related measurements based on the reported positioning capabilities of the UE, the set of PRS resources to be used for the first and second sets of positioning-related measurements, the set of reporting parameters, the accuracy configuration, the latency configuration, or any combination thereof.

In an aspect, a non-transitory computer-readable medium storing computer-executable instructions includes the computer-executable instructions comprising at least one instruction instructing a UE to send, to a network entity, a report indicating positioning capabilities of the UE, the positioning capabilities indicating a number of positioning calculations that the UE can perform per unit of time, per unit of frequency, or both, at least one instruction instructing the UE to receive a request to perform a first set of positioning-related measurements and to report a second set of positioning-related measurements that are associated with a set of PRS resources to be used for the first and second sets of positioning-related measurements, a set of reporting parameters to be used for the reporting, an accuracy configuration, a latency configuration, or any combination thereof, and at least one instruction instructing the UE to perform the first set of positioning-related measurements of the set of PRS resources and report the second set of positioning-related measurements based on the reported positioning capabilities of the UE, the set of PRS resources to be used for the first and second sets of positioning-related measurements, the set of reporting parameters, the accuracy configuration, the latency configuration, or any combination thereof.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
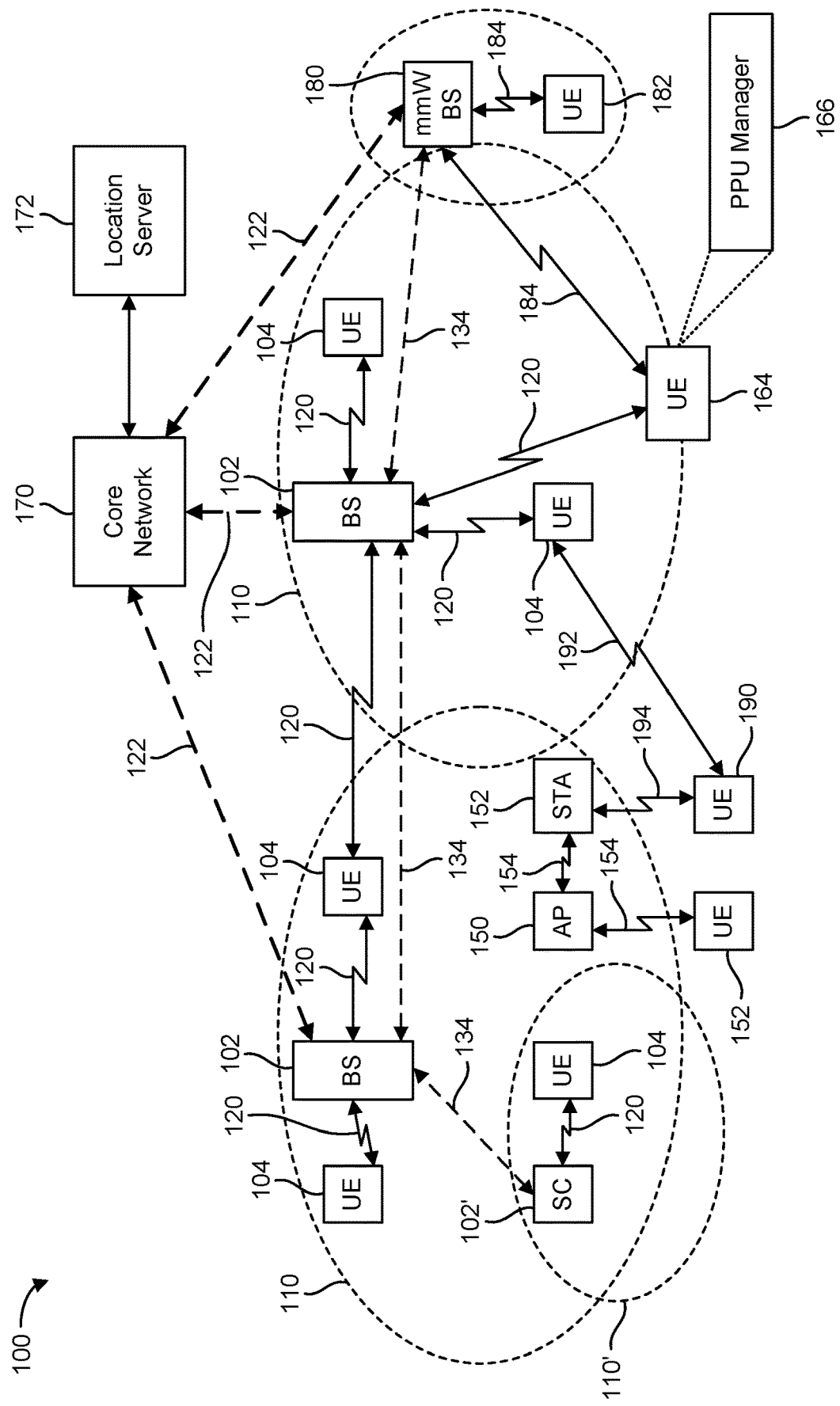
FIG. 1 illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) may include various base stations (BSs) 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to an NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station (SC) 102' may have a coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have a high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related to transmit beams. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), navigation reference signals (NRS), tracking reference signals (TRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164. In an aspect, the UE 164 may include a positioning processing unit (PPU) manager 166 that may enable the UE 164 to perform the UE operations described herein. Note that although only one UE in FIG. 1 is illustrated as having a PPU manager 166, any of the UEs in FIG. 1 may be configured to perform the UE operations described herein.

Figure 2A:
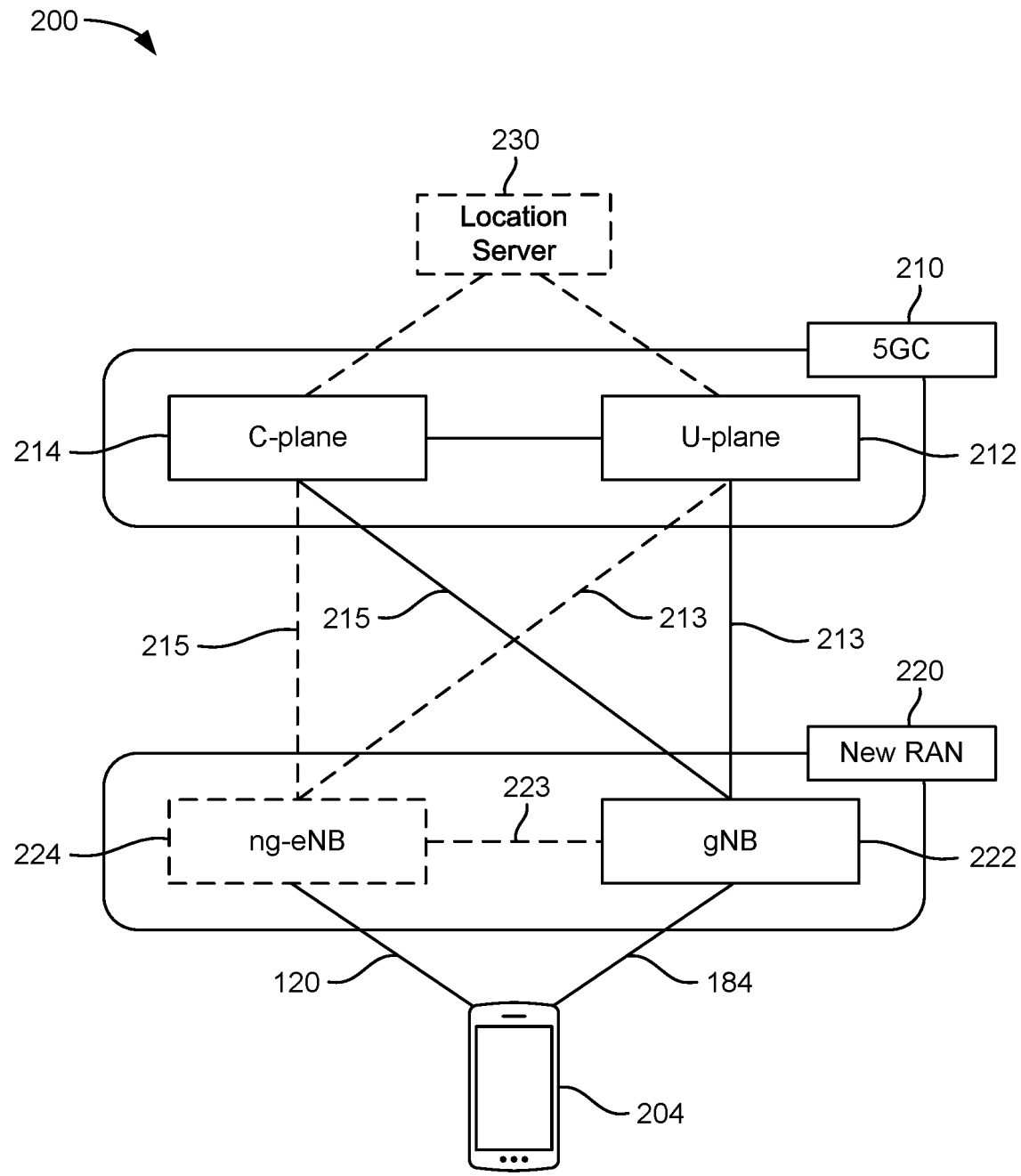
FIGS. 2A and 2B illustrate exemplary wireless network structures, according to various aspects of the disclosure.

According to various aspects, FIG. 2A illustrates an exemplary wireless network structure 200. For example, a 5GC 210 (also referred to as a Next Generation Core (NGC)) can be viewed functionally as control plane functions (C-plane) 214 (e.g., UE registration, authentication, network access, gateway selection, etc.) and user plane functions (U-plane) 212 (e.g., UE gateway function, access to data networks, IP routing, etc.), which operate cooperatively to form the core network. User plane interface (NG-U) 213 and control plane interface (NG-C) 215 connect the gNB 222 to the 5GC 210 and specifically to user plane functions 212 and the control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
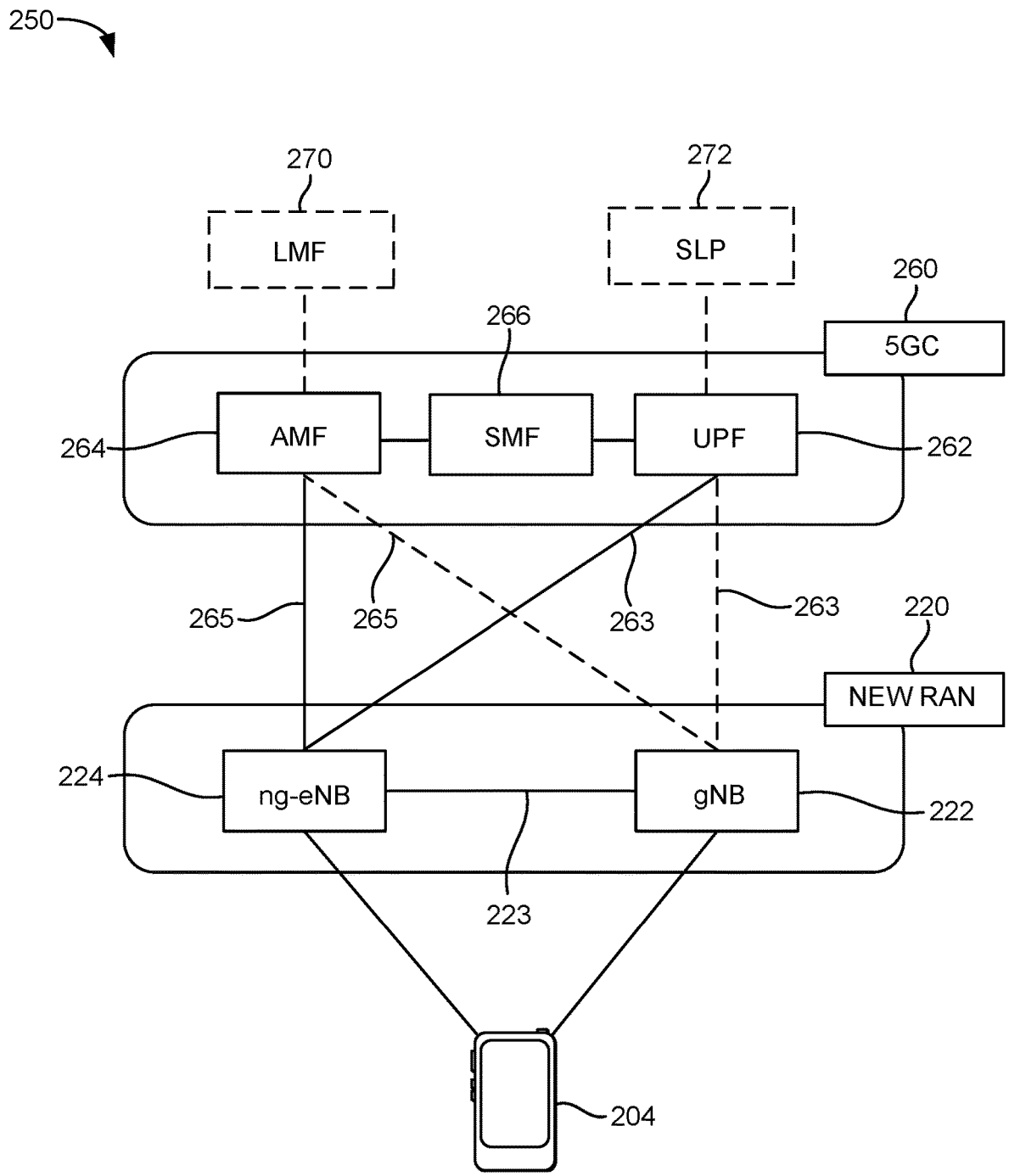

According to various aspects, FIG. 2B illustrates another exemplary wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but while the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
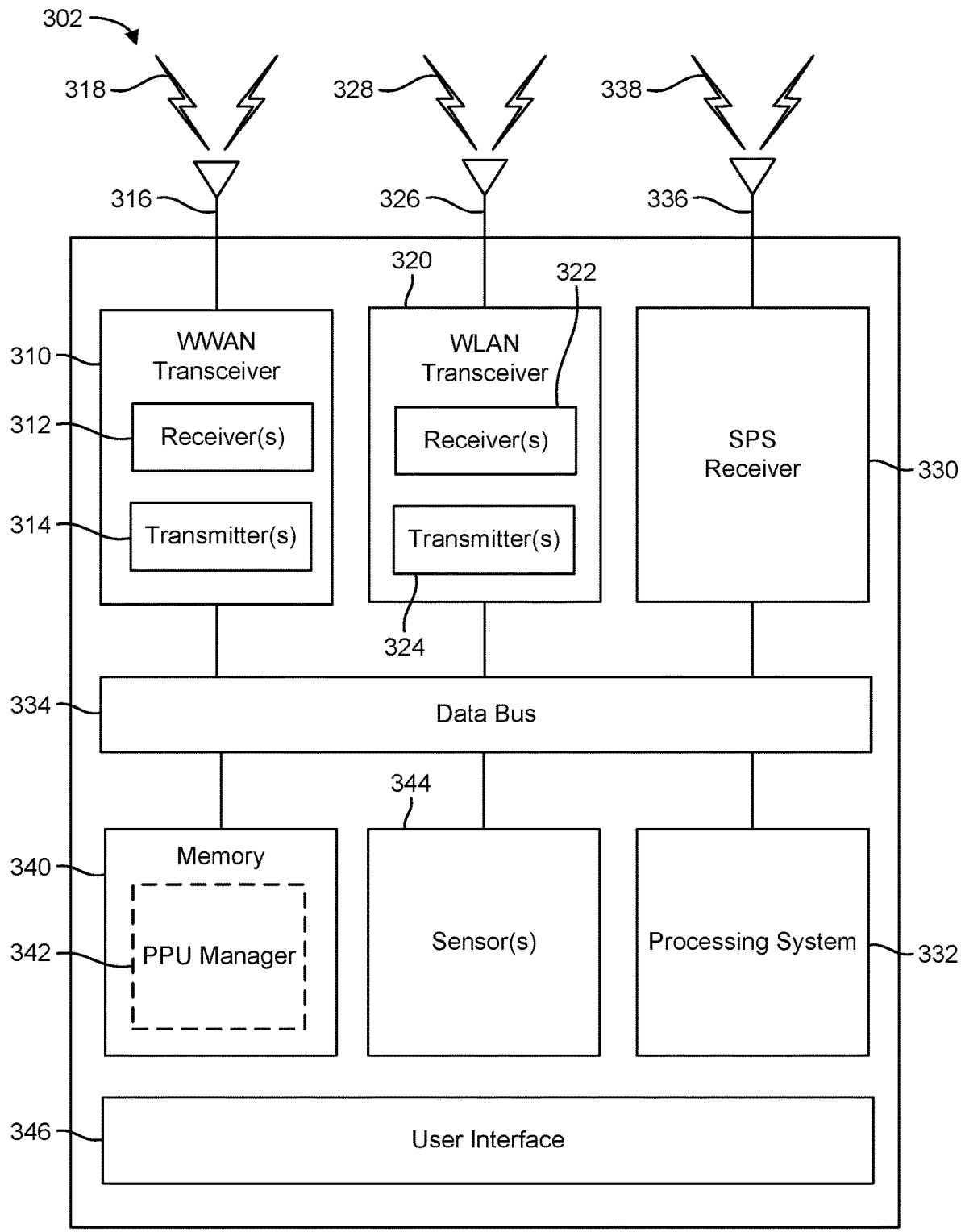
FIGS. 3A to 3C are simplified block diagrams of several exemplary aspects of components that may be employed in a UE, a base station, and a network entity, respectively, according to various aspects of the disclosure.
Figure 3B:
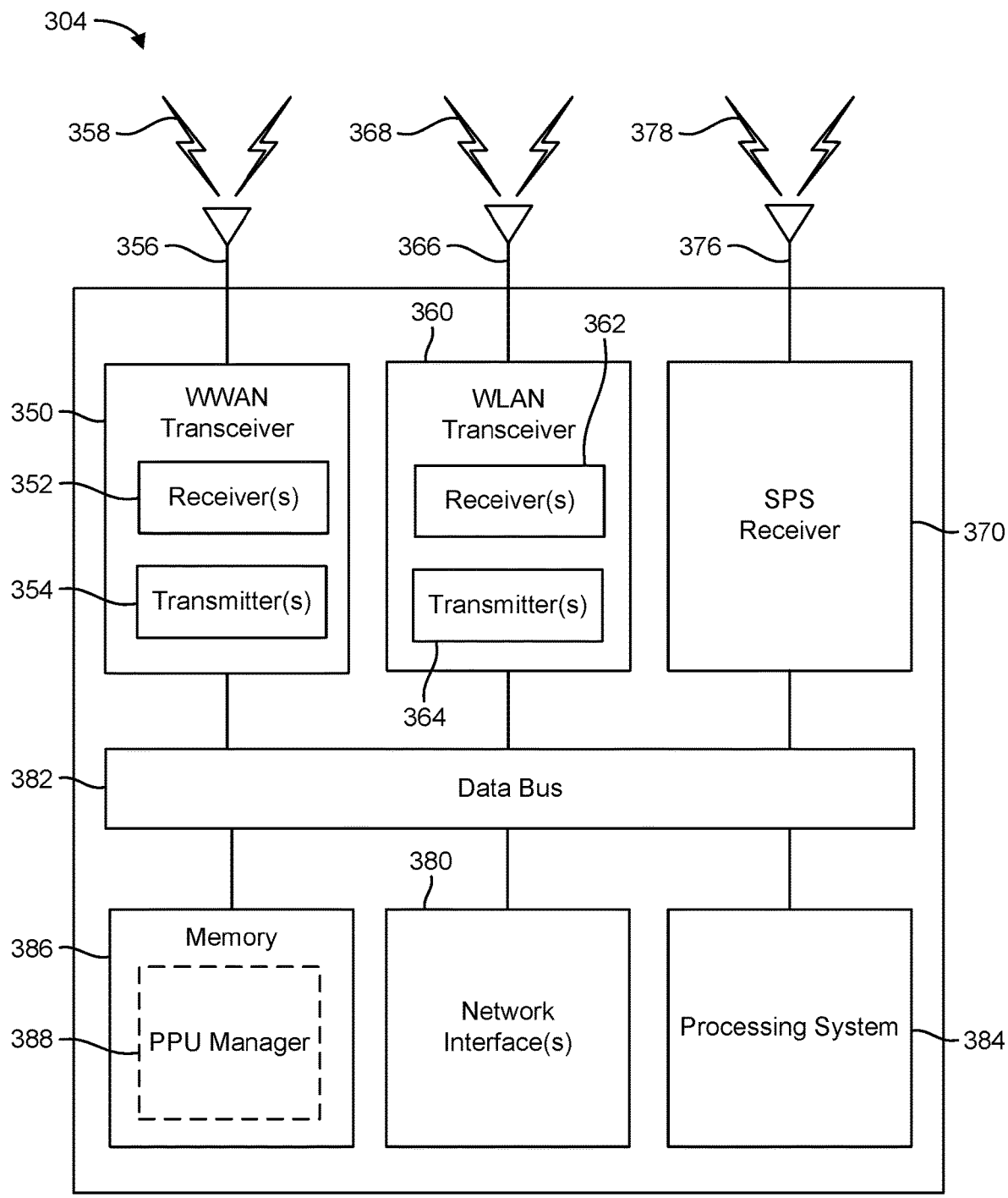
Figure 3C:
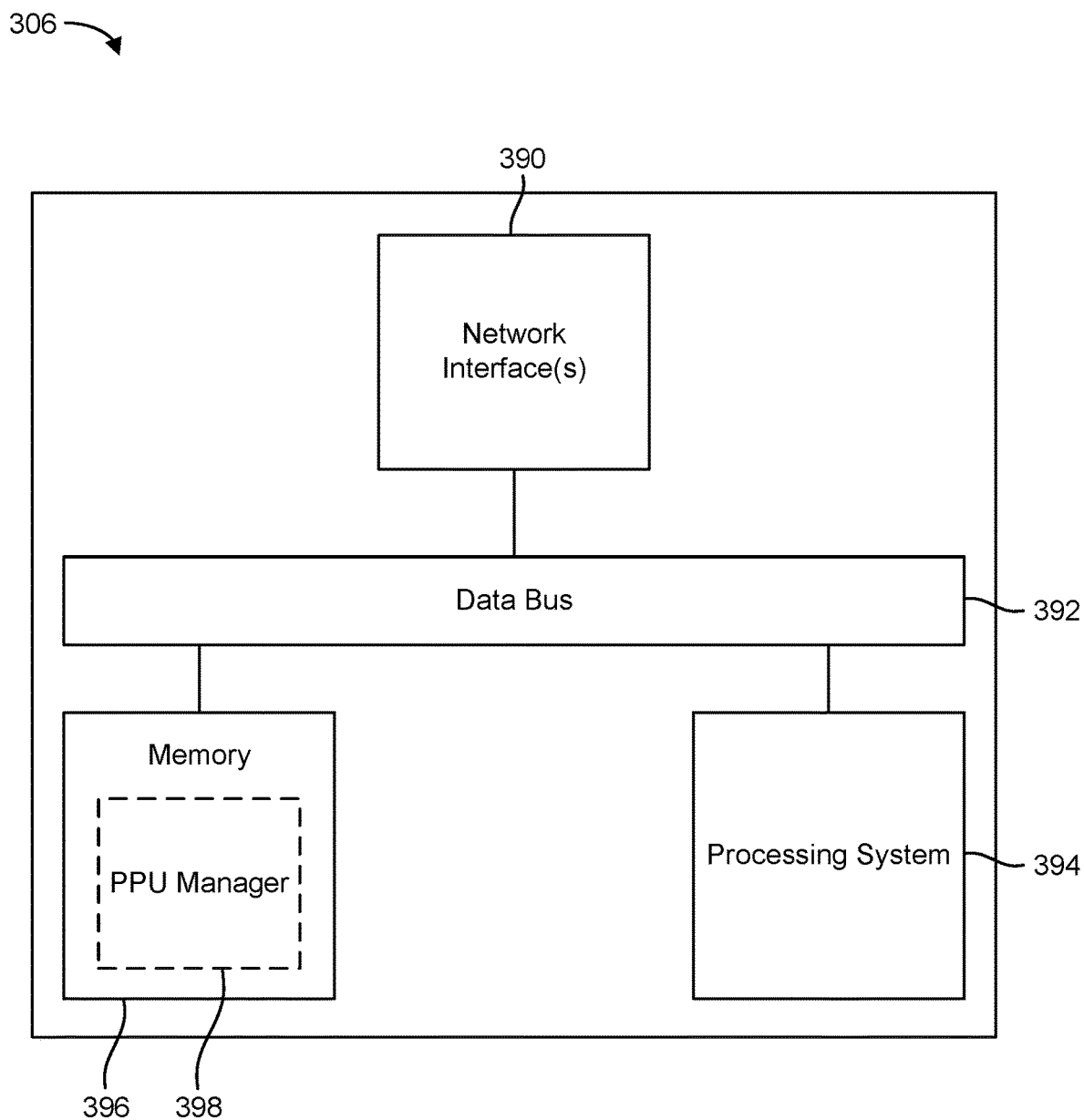

FIGS. 3A, 3B, and 3C illustrate several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230, the LMF 270, and the SLP 272) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., ng-eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the WLAN transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370, respectively. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm, respectively.

The base station 304 and the network entity 306 each include at least one network interfaces 380 and 390, respectively, for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, positioning operations, and for providing other processing functionality. The base station 304 includes a processing system 384 for providing functionality relating to, for example, positioning operations as disclosed herein, and for providing other processing functionality. The network entity 306 includes a processing system 394 for providing functionality relating to, for example, positioning operations as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include PPU managers 342, 388, and 398, respectively. The PPU managers 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the PPU managers 342, 388, and 398 may be external to the processing systems 332, 384, and 394 (e.g., part of a modem processing system, integrated with another processing system, etc.), respectively. Alternatively, the PPU managers 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the PPU managers 342, 388, and 398, etc.

Figure 4:
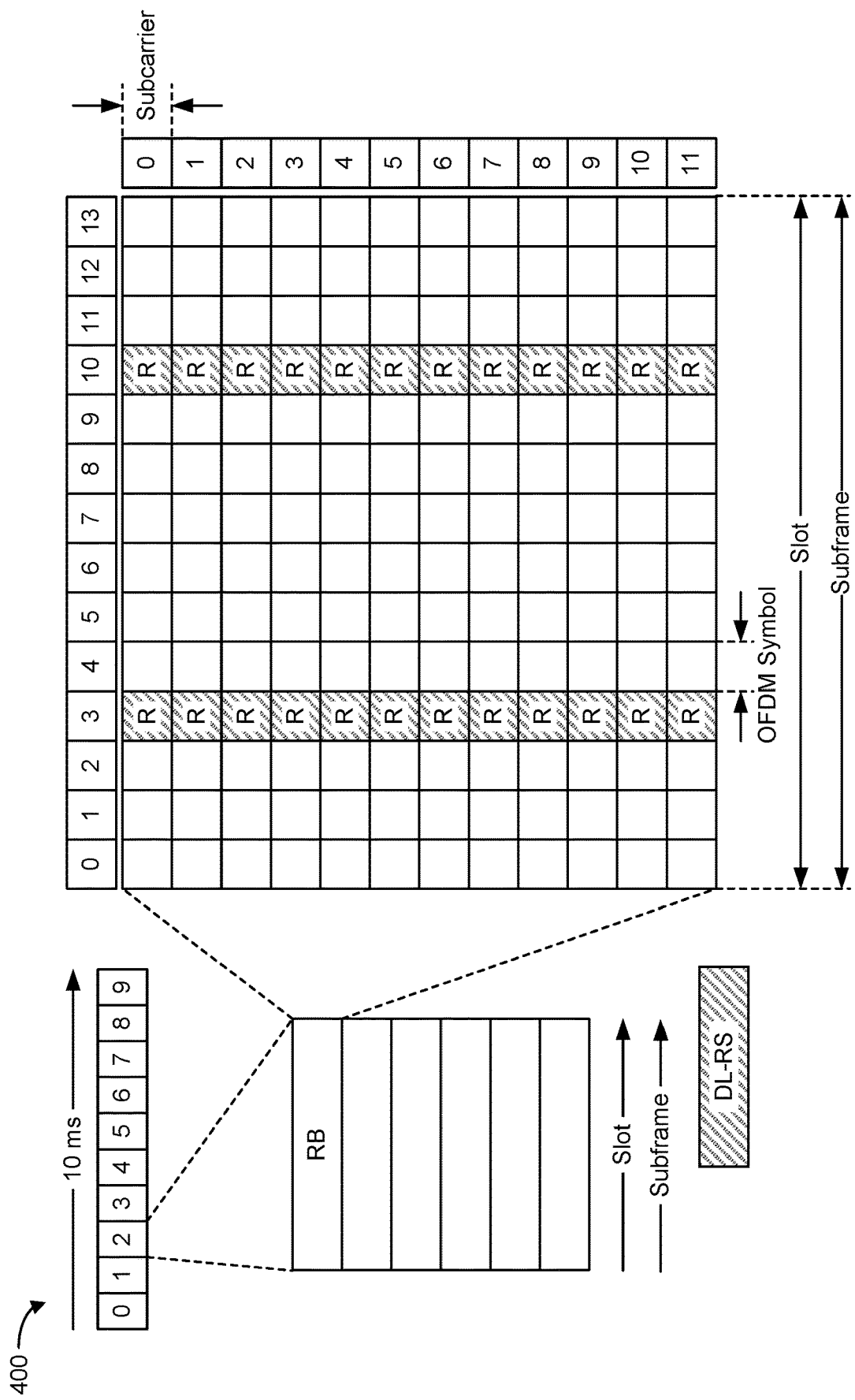
FIG. 4 is a diagram illustrating an exemplary frame structure, according to various aspects of the disclosure.

Various frame structures may be used to support downlink and uplink transmissions between network nodes (e.g., base stations and UEs). FIG. 4 is a diagram 400 illustrating an example of a downlink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies ($\mu$), for example, subcarrier spacing (SCS) of 15 kHz, 30 kHz, 60 kHz, 120 kHz, and 240 kHz or greater may be available. Table 1 provided below lists some various parameters for different NR numerologies.

TABLE 1

| $\mu$ | SCS (kHz) | Symbols/ Sot | Slots/ Subframe | Slots/ Frame | Slot Duration (ms) | Symbol Duration ($\mu$s) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In the example of FIG. 4, a numerology of 15 kHz is used. Thus, in the time domain, a frame (e.g., 10 ms) is divided into 10 equally sized subframes of 1 ms each, and each subframe includes one time slot. In FIG. 4, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

As illustrated in FIG. 4, some of the REs carry downlink reference (pilot) signals (DL-RS) for channel estimation at the UE. The DL-RS may include DMRS, CSI-RS, CRS, PRS, NRS, TRS, etc., exemplary locations of which are labeled "R" in FIG. 4.

A collection of resource elements (REs) that are used for transmission of PRS is referred to as a "PRS resource." The collection of resource elements can span multiple PRBs in the frequency domain and N (e.g., 1 or more) consecutive symbol(s) within a slot in the time domain. In a given OFDM symbol in the time domain, a PRS resource occupies consecutive PRBs in the frequency domain.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a cell ID). In addition, the PRS resources in a PRS resource set have the same periodicity, a common muting pattern configuration, and the same repetition factor across slots. The periodicity may have a length of $2^\mu \cdot t$ slots, with t selected from a set of {4, 5, 8, 10, 16, 20, 32, 40, 64, 80, 160, 320, 640, 1280, 2560, 5120, 10240}, and $\mu=0, 1, 2,$ or 3. The repetition factor may have a length of n slots, with n selected from a set of {1, 2, 4, 6, 8, 16, 32}.

A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance," a "positioning occasion," "a positioning instance," or simply an "occasion" or "instance."

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS in LTE, NRS in 5G, TRS, CRS, CSI-RS, DMRS, PSS, SSS, SSB, etc.

There are currently two alternatives for periodic PRS resource allocation. The first alterative is that the periodicity of downlink PRS resources is configured at the downlink PRS resource set level. In this case, a common period is used for downlink PRS resources within a downlink PRS resource set. The second alternative is that the periodicity of downlink PRS resources is configured at the downlink PRS resource level. In this case, different periods can be used for downlink PRS resources within a downlink PRS resource set.

Figure 5:
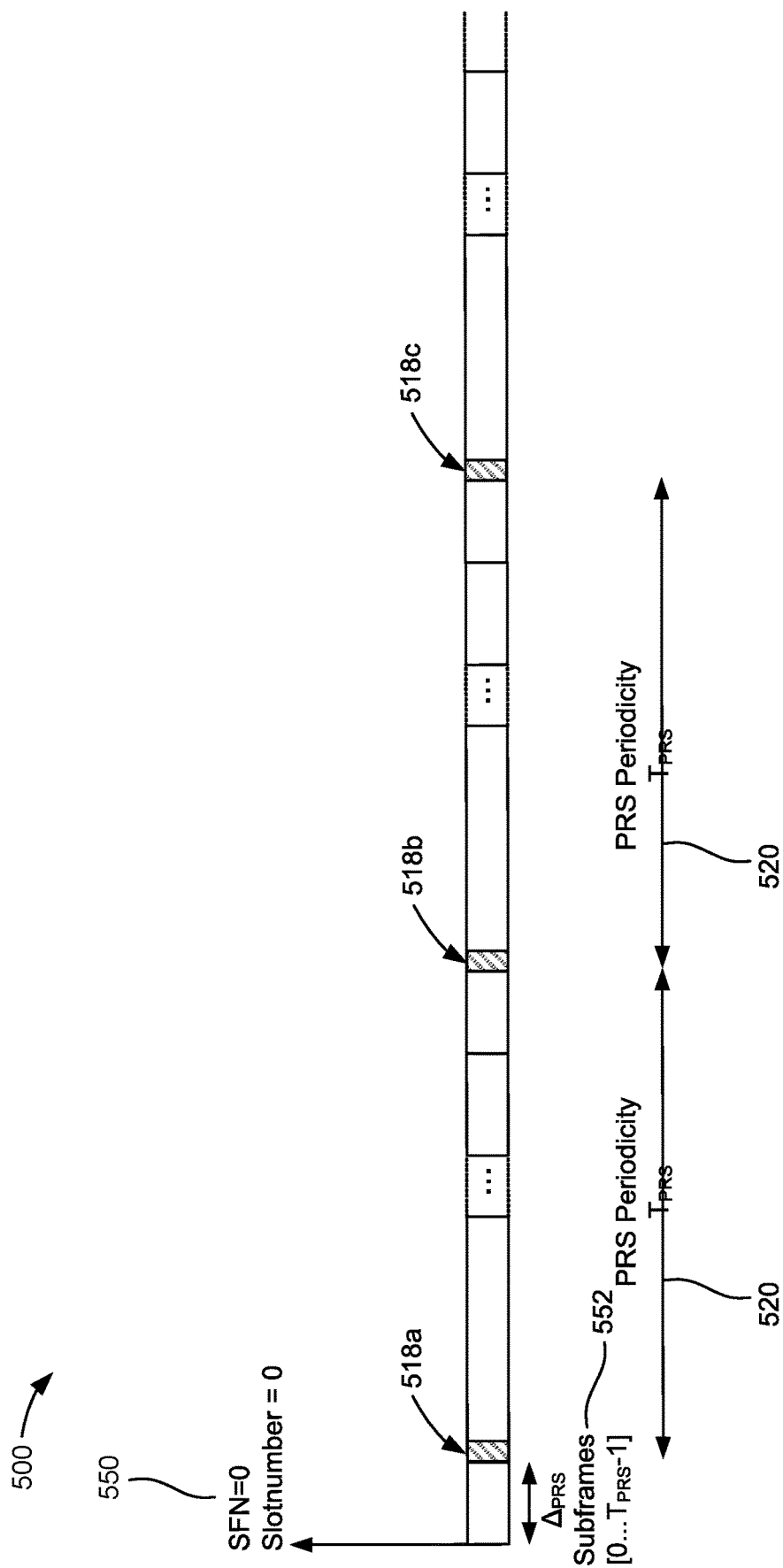
FIG. 5 illustrates an exemplary PRS configuration, according to various aspects of the disclosure.

FIG. 5 illustrates an exemplary PRS configuration 500 for a cell/TRP supported by a wireless node (e.g., a base station). FIG. 5 shows how PRS positioning occasions are determined by a system frame number (SFN), a cell-specific subframe offset ($\Delta_{PRS}$) 552, and a PRS periodicity ($T_{PRS}$) 520. Typically, the cell-specific PRS subframe configuration is defined by a PRS configuration index ($I_{PRS}$) included in positioning assistance data. The PRS periodicity ($T_{PRS}$) 520 and the cell-specific subframe offset ($\Delta_{PRS}$) are defined based on the PRS configuration index ($I_{PRS}$), as illustrated in Table 2 below.

TABLE 2

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$ − 160 |
| 480-1119 | 640 | $I_{PRS}$ − 480 |
| 1120-2399 | 1280 | $I_{PRS}$ − 1120 |
| 2400-2404 | 5 | $I_{PRS}$ − 2400 |
| 2405-2414 | 10 | $I_{PRS}$ − 2405 |
| 2415-2434 | 20 | $I_{PRS}$ − 2415 |
| 2435-474 | 40 | $I_{PRS}$ − 2435 |
| 2475-2554 | 80 | $I_{PRS}$ − 2475 |
| 2555-4095 | Reserved | |

A PRS configuration is defined with reference to the SFN of the cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0,$$

where $n_f$ is the SFN with $0 \leq n_f \leq 1023$, $n_s$ is the slot number within the radio frame defined by $n_f$ with $0 \leq n_s \leq 19$, $T_{PRS}$ is the PRS periodicity 520, and $\Delta_{PRS}$ is the cell-specific subframe offset 552.

As shown in FIG. 5, the cell-specific subframe offset ($\Delta_{PRS}$) 552 may be defined in terms of the number of subframes transmitted starting from SFN 0 ("Slot number=0," marked as slot 550) to the start of the first (subsequent) PRS positioning occasion. In the example in FIG. 5, the number of consecutive positioning subframes ($N_{PRS}$) in each of the consecutive PRS positioning occasions 518a, 518b, and 518c equals 4. Note that while $N_{PRS}$ may specify the number of consecutive positioning subframes per occasion, it may instead specify the number of consecutive positioning slots, based on implementation. For example, in LTE, $N_{PRS}$ specifies the number of consecutive positioning subframes per occasion, whereas in NR, $N_{PRS}$ specifies the number of consecutive positioning slots per occasion.

In some aspects, when a UE receives a PRS configuration index $I_{PRS}$ in the positioning assistance data for a particular cell, the UE may determine the PRS periodicity ($T_{PRS}$) 520 and PRS subframe offset $\Delta_{PRS}$ using Table 2. The UE may then determine the radio frame, subframe, and slot when a PRS is scheduled in the cell (e.g., using the equation above). The positioning assistance data may be determined by, for example, the location server, and include assistance data for a reference cell, and a number of neighbor cells supported by various wireless nodes.

Typically, PRS occasions from all cells in a network that use the same frequency are aligned in time and may have a fixed known time offset (e.g., cell-specific subframe offset ($\Delta_{PRS}$) 552) relative to other cells in the network that use a different frequency. In SFN-synchronous networks all wireless nodes (e.g., base stations) may be aligned on both frame boundary and system frame number. Therefore, in SFN-synchronous networks all cells supported by the various wireless nodes may use the same PRS configuration index $I_{PRS}$ for any particular frequency of PRS transmission. On the other hand, in SFN-asynchronous networks, the various wireless nodes may be aligned on a frame boundary, but not system frame number. Thus, in SFN-asynchronous networks, the PRS configuration index $I_{PRS}$ for each cell may be configured separately by the network so that PRS occasions align in time.

A UE may determine the timing of the PRS occasions of the reference and neighbor cells for positioning, if the UE can obtain the cell timing (e.g., SFN) of at least one of the cells, such as a reference cell or a serving cell. The timing of the other cells may then be derived by the UE based, for example, on the assumption that PRS occasions from different cells overlap.

For LTE systems, the sequence of subframes used to transmit PRS (e.g., for positioning) may be characterized and defined by a number of parameters, comprising: (i) a reserved block of bandwidth (BW), (ii) the PRS configuration index $I_{PRS}$, (iii) the duration $N_{PRS}$, (iv) an optional muting pattern, and (v) a muting sequence periodicity $T_{REP}$ that can be implicitly included as part of the muting pattern in (iv) when present. In some cases, with a fairly low PRS duty cycle, $N_{PRS}=1$, $T_{PRS}=160$ subframes (equivalent to 160 ms), and BW=1.4, 3, 5, 10, 15, or 20 MHz. To increase the PRS duty cycle, the $N_{PRS}$ value can be increased to six (i.e., $N_{PRS}=6$) and the bandwidth (BW) value can be increased to the system bandwidth (i.e., BW=LTE system bandwidth in the case of LTE). An expanded PRS with a larger $N_{PRS}$ (e.g., greater than six) and/or a shorter $T_{PRS}$ (e.g., less than 160 ms), up to the full duty cycle (i.e., $N_{PRS}=T_{PRS}$), may also be used in later versions of the LTE positioning protocol (LPP). A directional PRS may be configured as just described, and may, for example, use a low PRS duty cycle (e.g., $N_{PRS}=1$, $T_{PRS}=160$ subframes) or a high duty cycle.

There are a number of cellular network-based positioning technologies, which can be broadly categorized into time of arrival (ToA) and angle-based positioning methods, and further categorized into downlink-based, uplink-based, and downlink-and-uplink-based positioning methods. Downlink ToA-based positioning methods include observed time difference of arrival (OTDOA) in LTE and downlink time difference of arrival (DL-TDOA) in NR. Uplink ToA-based positioning methods include uplink time difference of arrival (UL-TDOA). Downlink-and-uplink ToA-based positioning methods include multi-round-trip-time (RTT) positioning (also referred to as "multi-cell RTT"). Downlink angle-based positioning methods include downlink angle-of-departure (DL-AoD) in NR, and uplink angle-based positioning methods include uplink angle of arrival (UL-AoA).

In an OTDOA or DL-TDOA positioning procedure, a UE measures the differences between the ToAs of reference signals (e.g., PRS, TRS, NRS, CSI-RS, SSB, etc.) received from pairs of base stations, referred to as reference signal time difference (RSTD) or time difference of arrival (TDOA) measurements, and reports them to a positioning entity. Based on the RSTD measurements and the known locations of the involved base stations, the positioning entity can estimate the UE's location. UL-TDOA is similar to DL-TDOA, but is based on uplink reference signals (e.g., SRS) transmitted by the UE.

For DL-AoD positioning, the positioning entity collects the angles and other channel properties (e.g., signal strength) of the downlink transmit beams used by at least one (but usually multiple) base station to communicate with a UE in order to estimate the location of the UE. Similarly, for UL-AoA positioning, the positioning entity collects the angles and other channel properties (e.g., gain level) of the uplink receive beams used by at least one (but usually multiple) base station to communicate with a UE in order to estimate the location of the UE.

In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier (ID), reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 6:
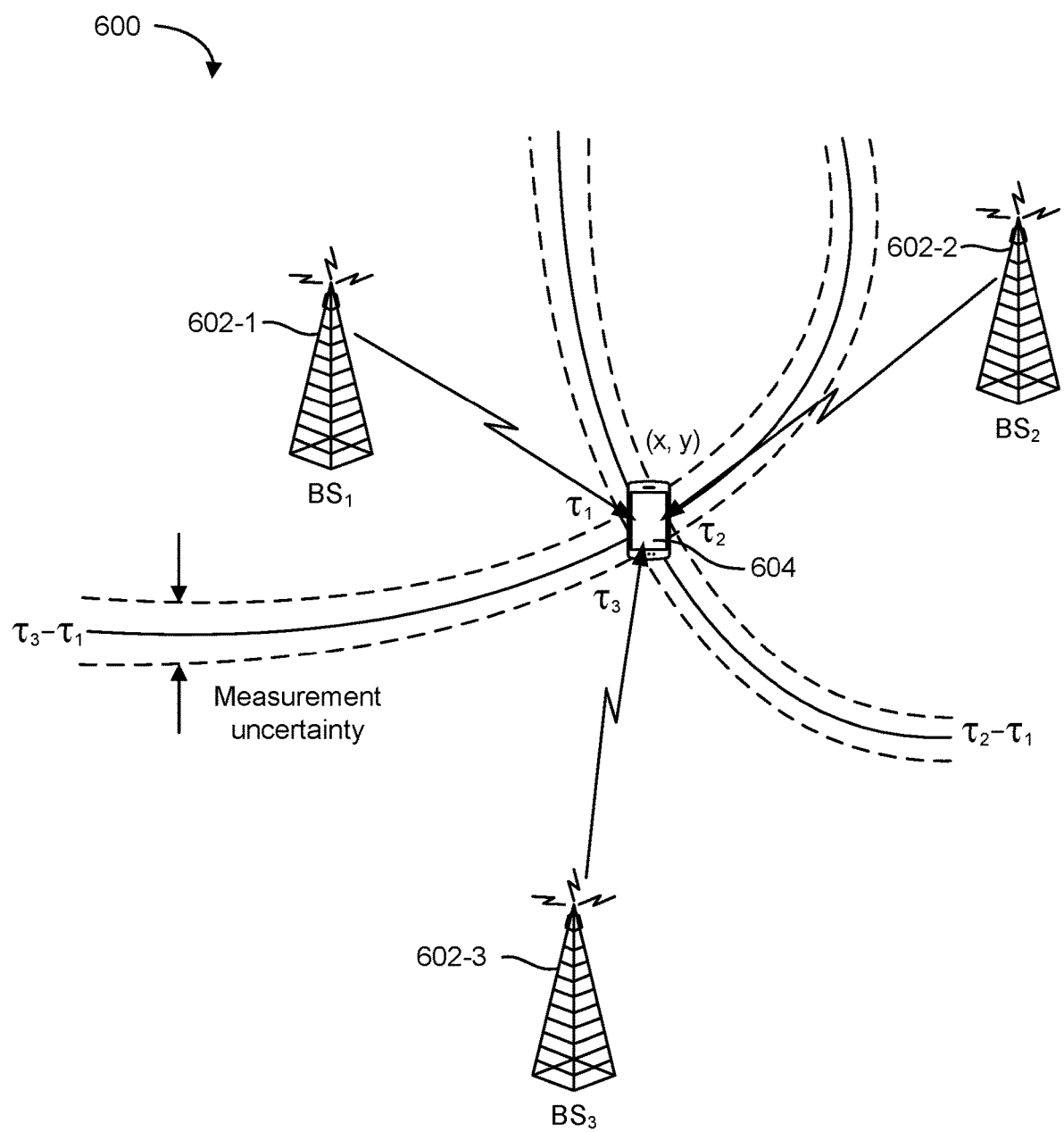
FIG. 6 is a diagram illustrating an exemplary technique for estimating a location of a mobile device using information obtained from a plurality of base stations, according to various aspects of the disclosure.

FIG. 6 illustrates an exemplary wireless communications system 600 according to various aspects of the disclosure. In the example of FIG. 6, a UE 604, which may correspond to any of the UEs described herein, is attempting to calculate an estimate of its location, or assist another entity (e.g., a base station or core network component, another UE, a location server, a third party application, etc.) to calculate an estimate of its location. The UE 604 may communicate wirelessly with a plurality of base stations 602-1, 602-2, and 602-3 (collectively, base stations 602), which may correspond to any combination of the base stations described herein, using RF signals and standardized protocols for the modulation of the RF signals and the exchange of information packets. By extracting different types of information from the exchanged RF signals, and utilizing the layout of the wireless communications system 600 (e.g., the base stations' 602 locations, geometry, etc.), the UE 604 may determine its location, or assist in the determination of its location, in a predefined reference coordinate system. In an aspect, the UE 604 may specify its position using a two-dimensional (2D) coordinate system; however, the aspects disclosed herein are not so limited, and may also be applicable to determining locations using a three-dimensional (3D) coordinate system, if the extra dimension is desired. Additionally, while FIG. 6 illustrates one UE 604 and three base stations 602, as will be appreciated, there may be more UEs 604 and more or fewer base stations 602.

To support location estimates, the base stations 602 may be configured to broadcast reference signals, such as PRS, NRS, TRS, CRS, CSI-RS, PSS, SSS, SSBs, etc., to UEs 604 in their coverage area to enable a UE 604 to measure characteristics of such reference signals. For example, for OTDOA and DL-TDOA positioning methods, the UE 604 measures the time difference, known as the RSTD or TDOA, between specific reference signals (e.g., PRS, CRS, CSI-RS, etc.) transmitted by different pairs of network nodes (e.g., base stations 602, antennas/antenna arrays of base stations 602, etc.) and either reports these time differences to a positioning entity, such as the location server 230, LMF 270, or SLP 272, or computes a location estimate itself from these time differences.

Generally, RSTDs are measured between a reference network node (e.g., base station 602-1 in the example of FIG. 6) and one or more neighbor network nodes (e.g., base stations 602-2 and 602-3 in the example of FIG. 6). The reference network node remains the same for all RSTDs measured by the UE 604 for any single positioning use of OTDOA/DL-TDOA and would typically correspond to the serving cell for the UE 604 or another nearby cell with good signal strength at the UE 604. In an aspect, where a measured network node is a cell/TRP supported by a base station, the neighbor network nodes would normally be cells/TRPs supported by base stations different from the base station for the reference cell/TRP and may have good or poor signal strength at the UE 604. The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

To assist positioning operations, a location server (e.g., location server 230, LMF 270, SLP 272) may provide positioning assistance data to the UE 604 for the reference network node (e.g., base station 602-1 in the example of FIG. 6) and the neighbor network nodes (e.g., base stations 602-2 and 602-3 in the example of FIG. 6) relative to the reference network node. For example, the assistance data may provide the center channel frequency of each network node, various reference signal configuration parameters (e.g., the number of consecutive positioning subframes, periodicity of positioning subframes, muting sequence, frequency hopping sequence, reference signal identifier (ID), reference signal bandwidth), a network node global ID, and/or other cell related parameters applicable to OTDOA/DL-TDOA. The positioning assistance data may indicate the serving cell for the UE 604 as the reference network node.

In some cases, positioning assistance data may also include "expected RSTD" parameters, which provide the UE 604 with information about the RSTD values the UE 604 is expected to measure at its current location between the reference network node and each neighbor network node, together with an uncertainty of the expected RSTD parameter. The expected RSTD, together with the associated uncertainty, may define a search window for the UE 604 within which the UE 604 is expected to measure the RSTD value. Positioning assistance information may also include reference signal configuration information parameters, which allow a UE 604 to determine when a reference signal positioning occasion occurs on signals received from various neighbor network nodes relative to reference signal positioning occasions for the reference network node, and to determine the reference signal sequence transmitted from various network nodes in order to measure a signal's ToA or RSTD.

In an aspect, while the location server (e.g., location server 230, LMF 270, SLP 272) may send the assistance data to the UE 604, alternatively, the assistance data can originate directly from the network nodes (e.g., base stations 602) themselves (e.g., in periodically broadcasted overhead messages, etc.). Alternatively, the UE 604 can detect neighbor network nodes itself without the use of assistance data.

The UE 604 (e.g., based in part on the assistance data, if provided) can measure and (optionally) report the RSTDs between reference signals received from pairs of network nodes. Using the RSTD measurements, the known absolute or relative transmission timing of each network node, and the known location(s) of the transmitting antennas for the reference and neighboring network nodes, a positioning entity (e.g., location server 230/LMF 270/SLP 272, a base station 602, the UE 604) may estimate a location of the UE 604. More particularly, the RSTD for a neighbor network node "k" relative to a reference network node "Ref" may be given as $(ToA_k - ToA_{Ref})$, where the ToA values may be measured modulo one subframe duration (1 ms) to remove the effects of measuring different subframes at different times. In the example of FIG. 6, the measured time differences between the reference cell of base station 602-1 and the cells of neighboring base stations 602-2 and 602-3 are represented as $\tau_2 - \tau_1$ and $\tau_3 - \tau_1$, where $\tau_1$, $\tau_2$, and $\tau_3$ represent the ToA of a reference signal from the transmitting antenna(s) of base stations 602-1, 602-2, and 602-3, respectively. The UE 604 may then convert the ToA measurements for different network nodes to RSTD measurements and (optionally) send them to the location server 230/LMF 270/SLP 272. Using (i) the RSTD measurements, (ii) the known absolute or relative transmission timing of each network node, (iii) the known position(s) of physical transmitting antennas for the reference and neighboring network nodes, and/or (iv) directional reference signal characteristics such as a direction of transmission, the UE's 604 location may be determined (either by the UE 604 or the location server 230/LMF 270/SLP 272).

Still referring to FIG. 6, when the UE 604 obtains a location estimate using OTDOA/DL-TDOA measured time differences, the necessary additional data (e.g., the network nodes' locations and relative transmission timing) may be provided to the UE 604 by a location server (e.g., location server 230, LMF 270, SLP 272). In some implementations, a location estimate for the UE 604 may be obtained (e.g., by the UE 604 itself or by the location server 230/LMF 270/SLP 272) from measured time differences and from other measurements made by the UE 604 (e.g., measurements of signal timing from GPS or other global navigation satellite system (GNSS) satellites). In these implementations, known as hybrid positioning, the OTDOA/DL-TDOA measurements may contribute towards obtaining the UE's 604 location estimate but may not wholly determine the location estimate.

UL-TDOA is a similar positioning method to OTDOA/DL-TDOA, but is based on uplink reference signals (e.g., SRS, UL PRS) transmitted by the UE (e.g., UE 604). Further, transmission and/or reception beamforming at the base station 602 and/or the UE 604 can enable wideband bandwidth at the cell edge for increased precision. Beam refinements may also leverage channel reciprocity procedures in 5G NR.

In NR, there may not be a requirement for precise timing synchronization across the network, as is required to perform OTDOA/DL-TDOA positioning. Instead, it may be sufficient to have coarse time-synchronization across base stations (e.g., within a cyclic prefix (CP) duration of the OFDM symbols). RTT-based methods generally only need coarse timing synchronization, and as such, may be a preferred positioning method in NR.

In a network-centric RTT estimation, the serving base station instructs the UE to, or notifies the UE that it may, scan for/receive the RTT measurement signals from two or more neighboring base stations (and typically the serving base station, as at least three base stations are needed). The one or more base stations transmit RTT measurement signals via low reuse resources (e.g., resources used by the base station to transmit system information), allocated by the network (e.g., location server 230, LMF 270, SLP 272). The UE records the ToA of each RTT measurement signal relative to the UE's current downlink timing (e.g., as derived by the UE from a downlink reference signal received from its serving base station), and transmits a common or individual RTT response message(s) to the one or more base stations (e.g., when instructed by its serving base station) and may include the difference between the measured arrival time of the RTT measurement signal and the transmission time of the RTT response message (referred to as the "UE Rx-Tx" or "$T_{Rx \to Tx}$" measurement) in a payload of each RTT response message(s). The RTT response message also includes a reference signal (e.g., an SRS) from which the base station can deduce the ToA of the RTT response. By comparing the difference between the ToA of the RTT response and the transmission time of the RTT measurement signal (referred to as the "BS Tx-Rx" or "$T_{Tx \to Rx}$" measurement) to the UE Rx-Tx measurement, the base station (or the positioning entity) can then determine the propagation time between the UE and the base station, from which it can then determine the distance between the UE and the base station by assuming the speed of light during this propagation time.

A UE-centric RTT estimation is similar to the network-based method, except that the UE transmits uplink RTT measurement signal(s), which are received by multiple base stations within communication range of the UE (e.g., the serving base station and neighboring base stations). In an aspect, a base station (e.g., the serving base station) may instruct the UE to transmit the uplink RTT measurement signal(s). Instructing the UE may include scheduling the resources on which the UE transmits the uplink RTT measurement signal(s). Alternatively, the base station may notify the UE that it may transmit uplink RTT measurement signal(s), and the notification may include an indication of the resources that can be used. Each base station responds to reception of the uplink RTT measurement signal(s) with a downlink RTT response message, which may include the arrival time of the RTT measurement signal at the base station in the RTT response message payload.

For both network-centric and UE-centric procedures, the side (network or UE) that performs the RTT calculation typically (though not always) transmits the first message or signal (e.g., RTT measurement signal), while the other side responds with one or more RTT response messages or signals that may include the arrival (or receive) time of the first message or signal in the RTT response message payload(s).

Figure 7A:
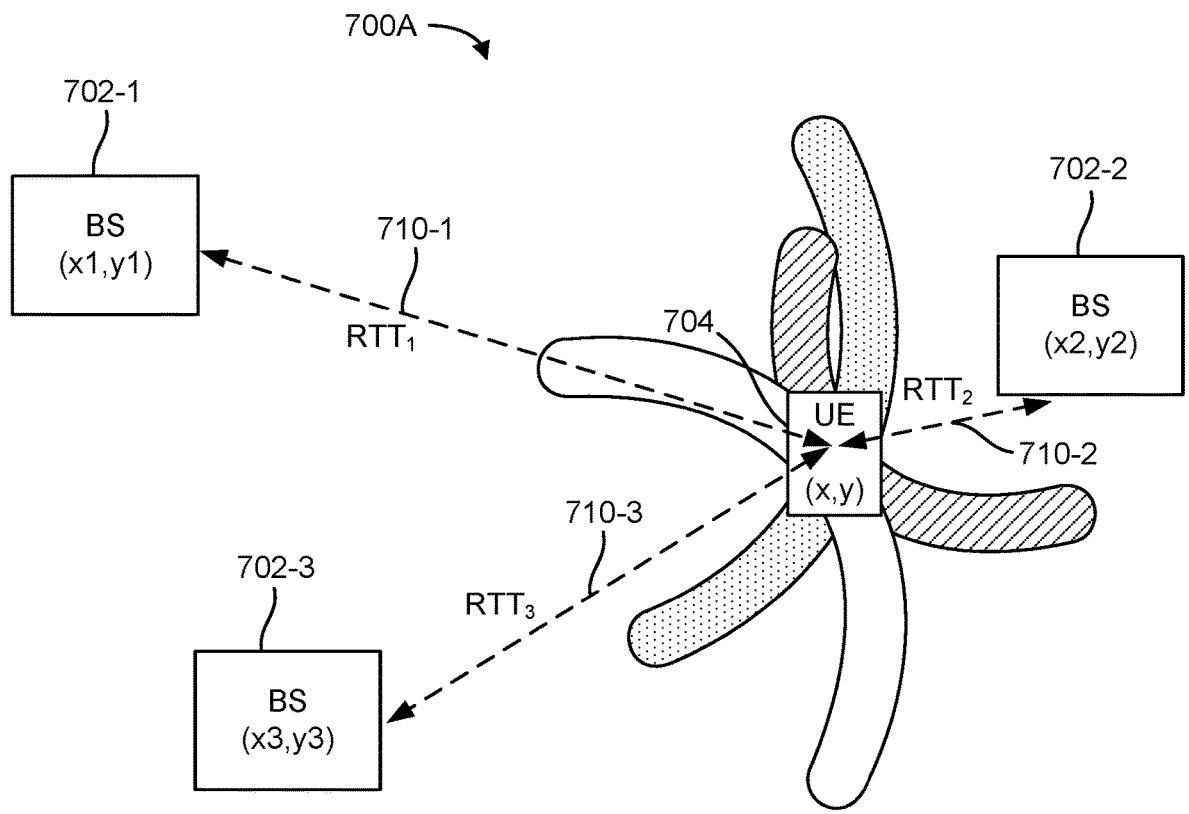
FIG. 7A is a diagram illustrating an exemplary technique for estimating a location of a UE using round-trip-time measurements associated with a plurality of base stations, according to various aspects of the disclosure.

FIG. 7A illustrates an exemplary wireless communications system 700A according to aspects of the disclosure. In the example of FIG. 7A, a UE 704 (which may correspond to any of the UEs described herein) is attempting to calculate an estimate of its location, or assist another entity (e.g., a base station or core network component, another UE, a location server, a third party application, etc.) to calculate an estimate of its location. The UE 704 may communicate wirelessly with a plurality of base stations 702-1, 702-2, and 702-3 (collectively, base stations 702, and which may correspond to any of the base stations described herein) using RF signals and standardized protocols for the modulation of the RF signals and the exchange of information packets. Note that while FIG. 7A illustrates one UE 704 and three base stations 702, as will be appreciated, there may be more UEs 704 and more base stations 702.

To support location estimates, the base stations 702 may be configured to broadcast reference signals (e.g., PRS, NRS, CRS, TRS, CSI-RS, PSS, SSS, etc.) to UEs 704 in their coverage area to enable a UE 704 to measure characteristics of such reference signals. For example, the UE 704 may measure the ToA of specific reference signals transmitted by at least three different base stations 702 and may use the RTT positioning method to report these ToAs (and additional information) back to the serving base station 702 or another positioning entity (e.g., location server 230, LMF 270, SLP 272).

In an aspect, although described as the UE 704 measuring reference signals from a base station 702, the UE 704 may measure reference signals from one of multiple cells/TRPs supported by a base station 702. Where the UE 704 measures reference signals transmitted on a cell/TRP supported by a first base station 702, the at least two other reference signals measured by the UE 704 to perform the RTT procedure should be from cells/TRPs supported by base stations 702 different from the first base station 702 and may have good or poor signal strength at the UE 704.

In order to determine the absolute location (x, y) of the UE 704, the entity determining the location of the UE 704 needs to know the locations of the base stations 702, which may be represented in a reference coordinate system as $(x_k, y_k)$, where k=1, 2, 3 in the example of FIG. 7A. Where the network (e.g., location server 230/LMF 270/SLP 272, one of the base stations 702) or the UE 704 determines the location of the UE 704, the locations of the involved base stations 702 may be provided to the serving base station 702 or the UE 704 by a location server with knowledge of the network geometry (e.g., location server 230, LMF 270, SLP 272). Alternatively, the location server may determine the location of the UE 704 using the known network geometry. In an aspect, the location of the UE 704 can be determined relative to the base stations 702, if, for example, the locations of the base stations 702 are not known, or an absolute location of the UE 704 is not necessary.

Either the UE 704 or the respective base station 702 may determine the distance ($d_k$, where k=1, 2, 3) between the UE 704 and the respective base station 702. In an aspect, the RTT of signals exchanged between the UE 704 and any base station 702 can be determined and converted to a distance ($d_k$) 710 (specifically, distances 710-1 to base station 702-1, distance 710-2 to base station 702-2, and distance 710-3 to base station 702-3 in the example of FIG. 7A). As discussed above, RTT techniques can measure the time between sending a signaling message (e.g., reference signals) and receiving a response. These methods may utilize calibration to remove any processing delays. In some environments, it may be assumed that the processing delays for the UE 704 and the base stations 702 are the same. However, such an assumption may not be true in practice.

Once each distance $d_k$ is determined, the UE 704, a base station 702, or the location server (e.g., location server 230, LMF 270, SLP 272) can solve for the location (x, y) of the UE 704 by using a variety of known geometric techniques, for example, trilateration. From FIG. 7A, it can be seen that the location of the UE 704 ideally lies at the common intersection of three semicircles, each semicircle being defined by radius $d_k$ and center ($x_k$, $y_k$), where k=1, 2, 3.

In some instances, as described further below, additional information may be obtained in the form of an AoA or AoD measurement that defines a straight line direction (e.g., which may be in a horizontal plane or in three dimensions) or possibly a range of directions (e.g., for the UE 704 from the location of a base station 702). The intersection of the two directions at or near the point (x, y) can provide another estimate of the location for the UE 704.

To perform an AoD positioning procedure, a base station may transmit reference signals (e.g., PRS, NRS, CRS, TRS, CSI-RS, PSS, SSS, etc.) to the UE on one or more downlink transmit beams, with each beam having a different weight. The different weights of the beams will result in different received signal strengths (e.g., RSRP, RSRQ, SINR, etc.) at the UE. Further, the channel impulse response will be smaller for transmit beams that are further from the actual line of sight (LOS) path between the base station and the UE than for transmit beams that are closer to the LOS path. Likewise, the received signal strength will be lower for transmit beams that are further from the LOS path than for transmit beams that are closer to the LOS path.

In one aspect of AoD-based positioning, where there is only one involved base station, the base station and the UE can perform an RTT procedure (as discussed below with reference to FIG. 7B) to determine the distance between the base station and the UE. Thus, the base station (or location server or other positioning entity) can determine both the direction to the UE (using AoD positioning) and the distance to the UE (using RTT positioning) to estimate the location of the UE. Note that the AoD of the beam having the highest received signal strength and strongest channel impulse response does not necessarily lie along the LOS path. However, for AoD-based positioning purposes, it is assumed to do so.

In another aspect of AoD-based positioning, where there are multiple involved base stations, each base station reports the determined AoD to the UE to the positioning entity (e.g., a location server, the serving base station, the UE). The positioning entity receives multiple such AoDs from a plurality of involved base stations (or other geographically separated transmission points) for the UE. With this information, and knowledge of the base stations' geographic locations, the positioning entity can estimate a location of the UE as the intersection of the received AoDs. There should be at least three involved base stations for a 2D location solution, but as will be appreciated, the more base stations that are involved in the positioning procedure, the more accurate the estimated location of the UE will be.

Figure 7B:
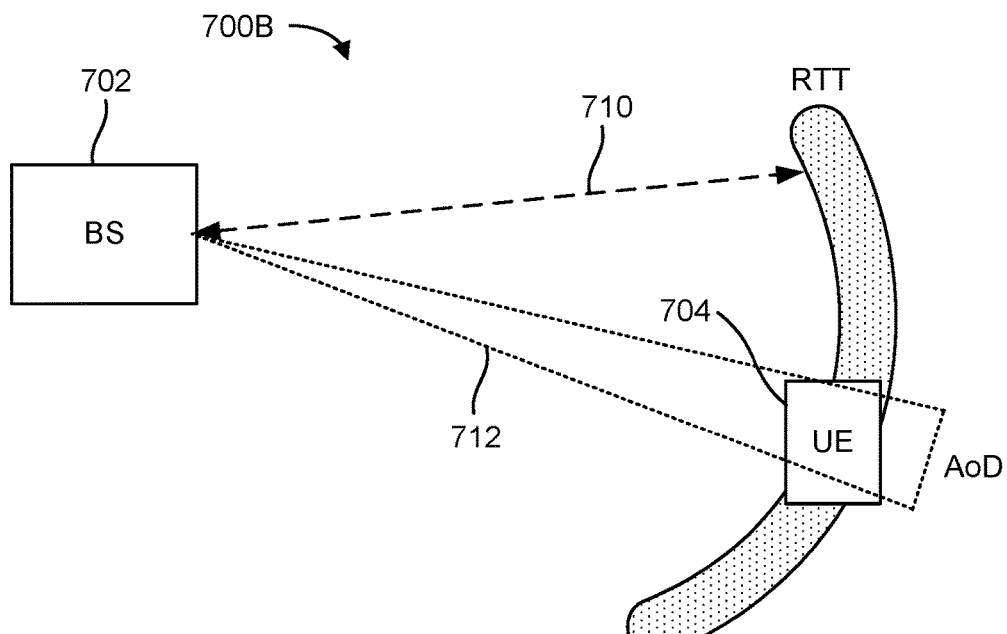
FIG. 7B is a diagram illustrating an exemplary technique for estimating a location of a UE using information obtained from a single base stations, according to various aspects of the disclosure.

FIG. 7B illustrates an exemplary wireless communications system 700B according to aspects of the disclosure. In the example of FIG. 7B, a UE 704 (which may correspond to any of the UEs described herein) is attempting to calculate an estimate of its location, or assist another positioning entity (e.g., a serving base station or core network component, another UE, a location server, a third party application, etc.) to calculate an estimate of its location. The UE 704 may communicate wirelessly with a base station (BS) 702 (e.g., any of the base stations described herein) using RF signals and standardized protocols for the modulation of the RF signals and the exchange of information packets.

To support location estimates, the base station 702 may broadcast reference signals (e.g., PRS, NRS, CRS, TRS, CSI-RS, SSB, PSS, SSS, etc.) to UEs 704 in its coverage area to enable a UE 704 to measure characteristics of such reference signals. For example, the UE 704 may measure the ToA and signal strength (e.g., RSRP) of specific reference signals transmitted by the base station 702 in order to perform RTT and/or DL-AoD positioning methods with the base station 702. Note that although described as the UE 704 measuring characteristics of reference signals from the base station 702, the UE 704 may measure reference signals from one of multiple cells or TRPs supported by the base station 702.

The distance 710 between the UE 704 and the base station 702 can be determined using an RTT positioning procedure, as described above with reference to FIG. 7A. Specifically, as described above, the RTT of RF signals exchanged between the UE 704 and the base station 702 can be used to calculate a distance 710 that defines a radius around the base station 702. The location of the UE 704 is assumed to lie on that radius with some amount of uncertainty. To further refine the estimated location of the UE 704, the base station 702 and the UE 704 can also perform an AoD positioning procedure to determine the angle between the base station 702 and the UE 704. Specifically, the UE 704 may determine and report the identity of the downlink transmit beam 712 that provides the highest signal strength and/or strongest channel impulse response for the reference signals received from the base station 702.

The results of the RTT and DL-AoD positioning procedures, or the measurements taken during these procedures, are forwarded to the positioning entity, which may be the UE 704, the base station 702, the serving base station (if not base station 702), or a location server (e.g., location server 230, LMF 270, SLP 272). In order to determine the location (e.g., in x-y or x-y-z coordinates) of the UE 704, the positioning entity also needs to know the location of the base station 702. Where the UE 704 determines its location, the location of the base station 702 may be provided to the UE 704 by the base station 702 or a location server with knowledge of the base station's 702 location (e.g., location server 230, LMF 270, SLP 272). Otherwise, the location of the base station 702 should be known to the base station 702 or the location server.

Once the RTT and AoD positioning procedures have been performed, the positioning entity can solve for the location of the UE 704 using the angle to the UE 704 (from the AoD positioning procedure), the distance to the UE 704 (from the RTT positioning procedure), and the known location of the base station 702. Where only the measurements from the RTT and AoD positioning procedures were reported, the positioning entity first calculates the distance and angle between the base station 702 and the UE 704 and then calculates the location of the UE 704 using those results.

Figure 8:
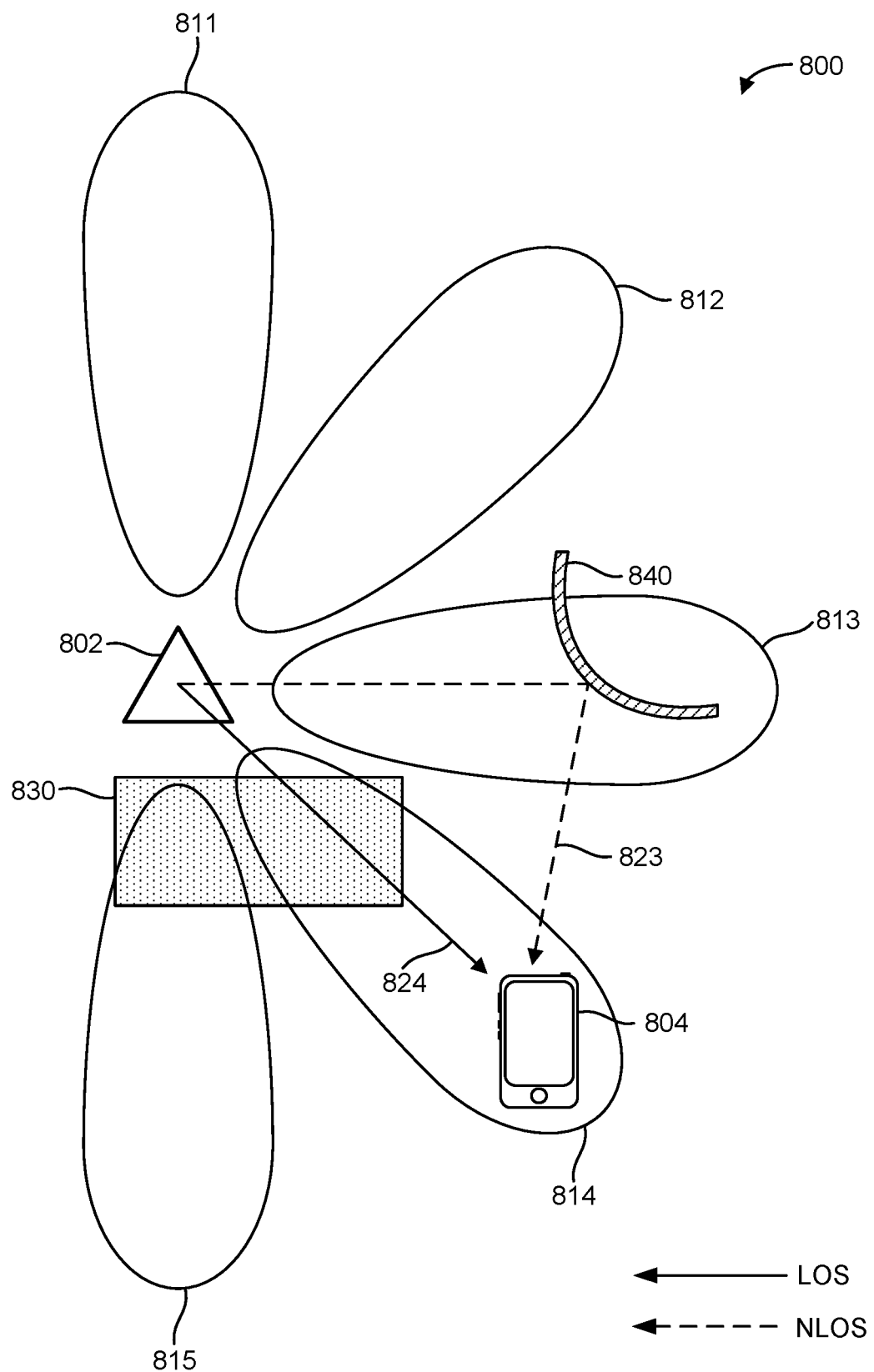
FIG. 8 is a diagram illustrating characteristics of beamforming wireless signals from a base station to a UE, according to various aspects of the disclosure.

FIG. 8 illustrates an exemplary wireless communications system 800 according to aspects of the disclosure. The UE 804 may communicate wirelessly with a base station 802, which may correspond to any of the base stations described herein, using RF signals and standardized protocols for the modulation of the RF signals and the exchange of information packets.

As illustrated in FIG. 8, the base station 802 may be utilizing beamforming to transmit a plurality of beams 811-815 of RF signals. Each beam 811-815 may be formed and transmitted by an array of antennas (e.g., a TRP) of the base station 802. Although FIG. 8 illustrates a base station 802 transmitting five beams, as will be appreciated, there may be more or fewer than five beams, and beam shapes, such as peak gain, width, and side-lobe gains, may differ amongst the transmitted beams.

A beam index may be assigned to each of the plurality of beams 811-815 for purposes of distinguishing RF signals associated with one beam from RF signals associated with another beam. Moreover, the RF signals associated with a particular beam of the plurality of beams 811-815 may carry a beam index indicator. A beam index may also be derived from the time of transmission (e.g., frame, slot, and/or OFDM symbol number) of the RF signal. The beam index indicator may be, for example, a three-bit field for uniquely distinguishing up to eight beams. If two different RF signals having different beam indices are received, this would indicate that the RF signals were transmitted using different beams. If two different RF signals share a common beam index, this would indicate that the different RF signals were transmitted using the same beam. Another way to describe that two RF signals are transmitted using the same beam is to say that the antenna port(s) used for the transmission of the first RF signal are spatially quasi-collocated with the antenna port(s) used for the transmission of the second RF signal.

In the example of FIG. 8, the UE 804 may receive a non-line of sight (NLOS) data stream 823 of RF signals transmitted on beam 813 and an LOS data stream 824 of RF signals transmitted on beam 814. Although FIG. 8 illustrates the NLOS data stream 823 and the LOS data stream 824 as single lines (dashed and solid, respectively), as will be appreciated, the NLOS data stream 823 and the LOS data stream 824 may each comprise multiple rays (i.e., "clusters") by the time they reach the UE 804 due, for example, to the propagation characteristics of RF signals through multipath channels. For example, a cluster of RF signals may be formed when an electromagnetic wave is reflected off of multiple surfaces of an object, and reflections arrive at the receiver (e.g., UE 804) from roughly the same angle, each travelling a few wavelengths (e.g., centimeters) more or less than others. A "cluster" of received RF signals generally corresponds to a single transmitted RF signal.

In the example of FIG. 8, the NLOS data stream 823 is not originally directed at the UE 804, although, as will be appreciated, it could be. However, it reflects off a reflector 840 (e.g., a building) and reaches the UE 804 without obstruction, and therefore, may still be a relatively strong RF signal. In contrast, the LOS data stream 824 is directed at the UE 804 but passes through an obstruction 830 (e.g., vegetation, a building, a hill, a disruptive environment such as clouds or smoke, etc.) that may significantly degrade the RF signal. As will be appreciated, although the LOS data stream 824 is weaker than the NLOS data stream 823, the LOS data stream 824 will arrive at the UE 804 before the NLOS data stream 823 because it follows a shorter path from the base station 802 to the UE 804.

The beam of interest for data communication between a base station (e.g., base station 802) and a UE (e.g., UE 804) is the beam carrying RF signals that arrives at the UE with the highest signal strength (e.g., highest RSRP, RSRQ, SINR), whereas the beam of interest for location estimation is the beam carrying RF signals that excite the LOS path and that has the highest gain along the LOS path amongst all other beams (e.g., beam 814). That is, even if beam 813 (the NLOS beam) were to weakly excite the LOS path (due to the propagation characteristics of RF signals, even though not being focused along the LOS path), that weak signal, if any, of the LOS path of beam 813 may not be as reliably detectable (compared to that from beam 814), thus leading to greater error in performing a positioning measurement.

While the beam of interest for data communication and the beam of interest for location estimation may be the same beams for some frequency bands (e.g., in FR1), for other frequency bands, such as mmW, they may not be the same beams. As such, referring to FIG. 8, where the UE 804 is engaged in a data communication session with the base station 802 (e.g., where the base station 802 is the serving base station for the UE 804) and not simply attempting to measure reference signals transmitted by the base station 802, the beam of interest for the data communication session may be beam 813, as it is carrying the unobstructed NLOS data stream 823. The beam of interest for location estimation, however, would be beam 814, as it carries the strongest LOS data stream 824, despite being obstructed.

Figure 9:
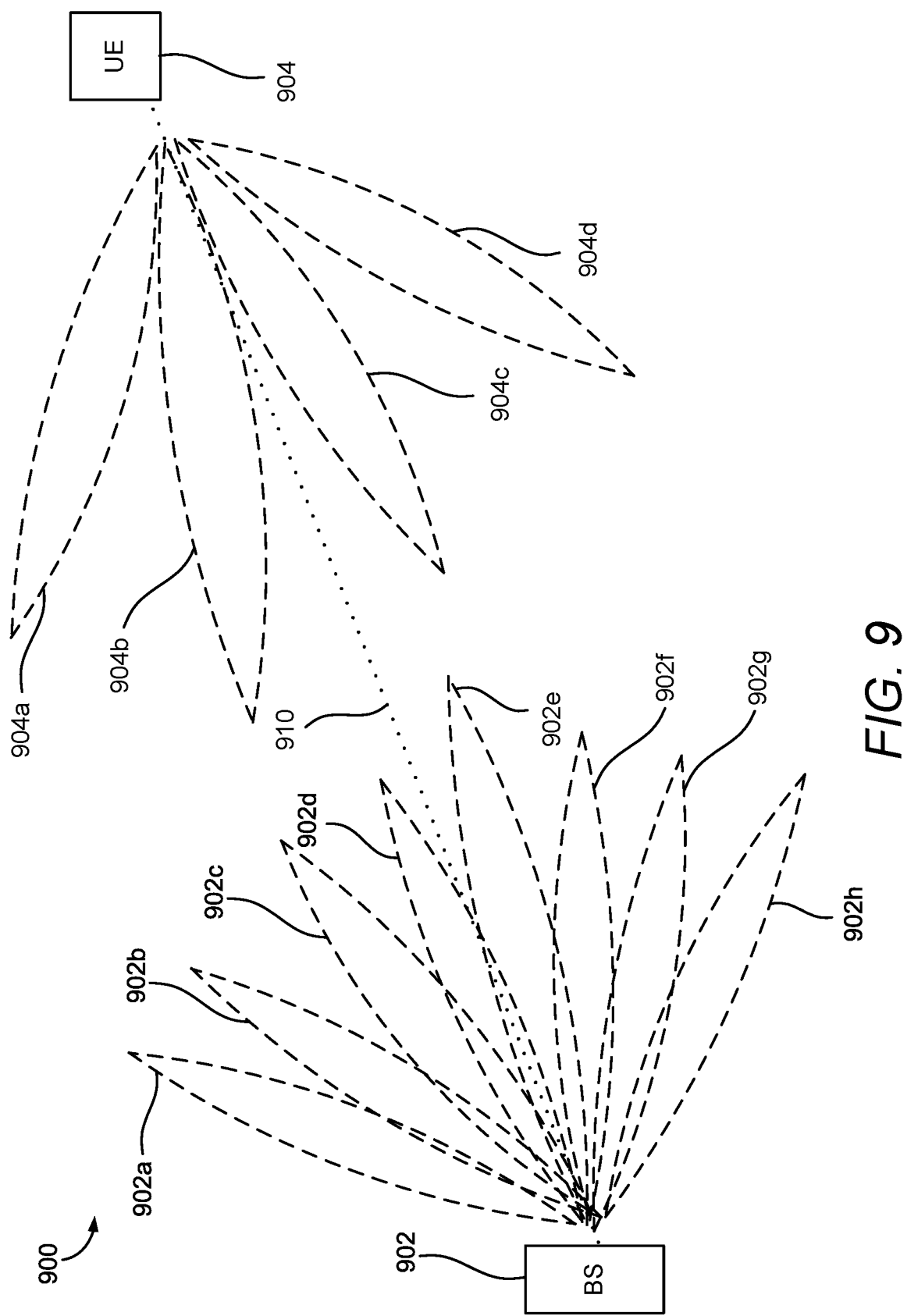
FIG. 9 is a diagram illustrating exemplary beams between a base station and a UE, according to various aspects of the disclosure.

FIG. 9 is a diagram 900 illustrating an exemplary base station 902 (which may correspond to any of the base stations described herein) in communication with an exemplary UE 904 (which may correspond to any of the UEs described herein), according to various aspects of the disclosure. Referring to FIG. 9, the base station 902 may transmit a beamformed signal to the UE 904 on one or more transmit beams 902a, 902b, 902c, 902d, 902e, 902f, 902g, 902h. For example, where the base station is beamforming towards the UE 904 with a single array of antennas, the base station 902 may perform a "beam sweep" by transmitting first beam 902a, then beam 902b, and so on until lastly transmitting beam 902h. Alternatively, the base station 902 may transmit beams 902a-902h in some pattern, such as beam 902a, then beam 902h, then beam 902b, then beam 902g, and so on. Where the base station 902 is beamforming towards the UE 904 using multiple arrays of antennas, each antenna array may perform a beam sweep of a subset of the beams 902a-902h. Alternatively, each of beams 902a-902h may correspond to a single antenna or antenna array.

The UE 904 may receive the beamformed signal from the base station 902 on one or more receive beams 904a, 904b, 904c, 904d. Note that for simplicity, the beams illustrated in FIG. 9 represent either transmit beams or receive beams, depending on which of the base station 902 and the UE 904 is transmitting and which is receiving. Thus, the UE 904 may transmit a beamformed signal to the base station 902 on one or more of the beams 904a-904d, and the base station 902 may receive the beamformed signal from the UE 904 on one or more of the beams 902a-902h.

The base station 902 and the UE 904 may perform beam training to determine the best receive and transmit beams for each of the base station 902 and the UE 904. For example, depending on environmental conditions and other factors, the base station 902 and the UE 904 may determine that the best transmit and receive beams are 902d and 904b, respectively, or beams 902e and 904c, respectively. The direction of the best transmit beam for the base station 902 may or may not be the same as the direction of the best receive beam, and likewise, the direction of the best receive beam for the UE 904 may or may not be the same as the direction of the best transmit beam.

The base station 902 may transmit reference signals (e.g., PRS, NRS, CRS, TRS, CSI-RS, PSS, SSS, etc.) to the UE 904 for positioning purposes on one or more of beams 902a-902h. Similarly, the UE 904 may transmit reference signals (e.g., SRS, UL PRS, etc.) to the base station 902 for positioning purposes on one or more of beams 904a-904d. In an aspect, the transmitter (i.e., the base station 902 or the UE 904) may use AoD positioning techniques, as described above with reference to FIG. 7B, to estimate a location of the receiver (i.e., the other of the base station 902 and the UE 904). For example, the base station 902 may transmit reference signals to the UE 904 on multiple beams, with each beam having different weights. The different weights of the beams will result in different received signal strengths (e.g., RSRP, RSRQ, SINR, etc.) at the UE 904. Further, the channel impulse response will be smaller for transmit beams that are further from the LOS path between the base station 902 and the UE 904 than for transmit beams that are closer to the LOS path. Likewise, the received signal strength will be lower for transmit beams that are further from the LOS path than for transmit beams that are closer to the LOS path.

In the example of FIG. 9, the LOS path between the base station 902 and the UE 904 is represented as LOS path 910. If the base station 902 transmits reference signals to the UE 904 on beams 902c, 902d, 902e, then transmit beam 902d is best aligned with the LOS path 910, while transmit beams 902c and 902e are not. As such, beam 902d will have a stronger channel impulse response and higher received signal strength than beams 902c and 902e. The UE 904 can report the channel impulse response and received signal strength of each measured transmit beam to the base station 902, or alternatively, the identity of the transmit beam having the strongest channel impulse response and highest received signal strength. With this information, the base station 902 can estimate the position of the UE 904 as in the direction (i.e., the AoD) of that transmit beam, here, transmit beam 902d.

To provide a more accurate estimate of the UE's 904 location, the base station 902 and the UE 904 can perform an RTT procedure (as discussed above with reference to FIG. 7B) to determine the distance between the base station 902 and the UE 904. Thus, the base station 902 can determine both the direction to the UE 904 (using AoD positioning) and the distance to the UE 904 (using RTT positioning) to estimate the location of the UE 904.

Figure 10:
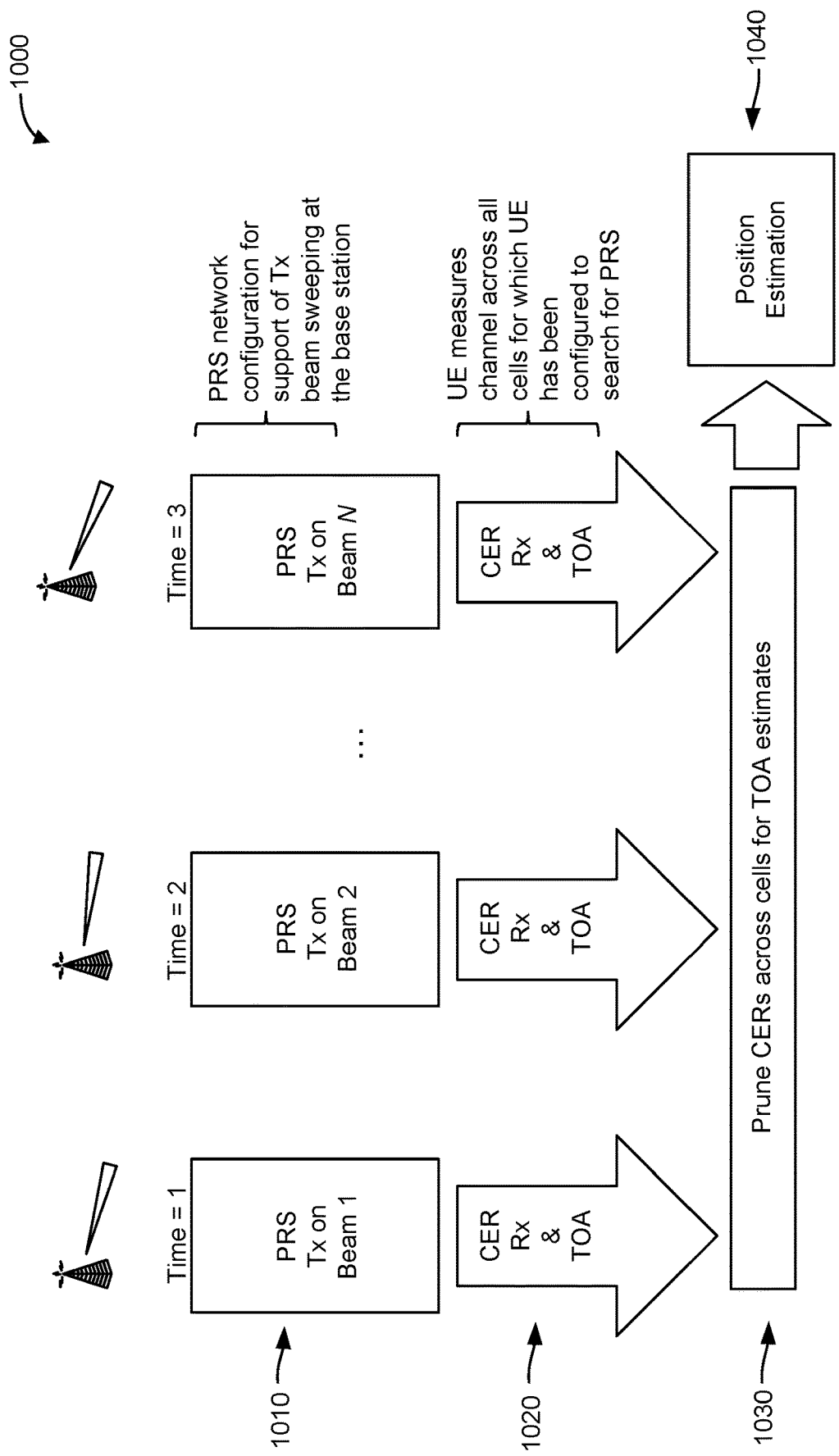
FIG. 10 is a diagram of an exemplary physical layer procedure for processing PRS transmitted on multiple beams, according to various aspects of the disclosure.

FIG. 10 is a diagram of an exemplary physical layer procedure 1000 for processing PRS transmitted on multiple beams, according to various aspects of the disclosure. At stage 1010, the network (e.g., location server 230 or LMF 270, SLP 272) configures a given base station (e.g., a gNB) to transmit beamformed PRS to one or more UEs in the coverage area(s) of the cell(s) supported by the base station. The PRS configuration may include multiple instances of PRS (e.g., as described above with reference to FIG. 5) to be beam swept (e.g., as described above with reference to FIG. 9) across all AoDs for each cell at full transmit power per beam. In the example of FIG. 10, the base station transmits PRS on a first beam ("Beam 1") at a first time ("Time=1"), a second beam ("Beam 2") at a second time ("Time=2"), and so on until an Nth beam ("Beam N") at an Nth time ("Time=N"), where N is an integer from 1 to 128 (i.e., there may be as many as 128 beams for a single cell). The illustrated beams may be for a particular cell supported by the base station, and the base station may beam sweep PRS in each of the cells it supports. The base station may beam sweep using a single antenna or antenna array, in which case, that antenna or antenna array transmits each beam (Beams 1 to N). Alternatively, the base station may beam sweep using multiple antennas or antenna arrays, in which case, each antenna or antenna array transmits one or more of Beams 1 to N.

At 1020, a given UE monitors all cells that it has been configured by the network to monitor and that are configured to transmit PRS across the configured instances. There may need to be several PRS instances/occasions to permit the UE to detect a sufficient number of cells for positioning (due to the time it takes the UE to tune its radio from one cell to another and then monitor the cell). The UE measures the channel, in particular the channel energy response (CER) and ToA, across all cells for which the UE has been configured to search for PRS.

At 1030, the UE prunes the CERs across cells to determine the ToAs of the PRS beams. At 1040, the ToAs can be used to estimate the position of the UE using, for example, OTDOA/DL-TDOA (as illustrated in FIG. 6), RTT (as illustrated in FIG. 7A), DL-AoD (as illustrated in FIG. 7B), etc. The UE can estimate its position based on the ToAs if it has been provided with a base station almanac (BSA). Alternatively, the network can estimate the position of the UE if the UE reports the ToAs to the network.

There is a significant increase in complexity between positioning in LTE and positioning in NR. In LTE, each base station (e.g., eNB) can configure only one PRS resource, every T ms. In contrast, in NR, each base station (e.g., gNB) can configure X PRS resources (i.e., X PRS beams), every T ms. X can be a value up to 128 for FR2, up to eight for FR1 time-division duplex (TDD) (e.g., China Mobile Communication Corporation (CMCC)), or 1 or 2 for FR1 FDD (e.g., T-Mobile E-911). In addition, in LTE, the FFT size is 2K, whereas in 5G, the FFT size is 8K (to allow quadradic interpolation). Further, in LTE, there are 16 REs/PRBs per PRS resource (specifically, 8 symbols with comb-6). In NR, however, the potential worst case may be six symbols times six REs/symbols for 36 REs/PRBs per PRS resource. Thus, the potential worst case increase in complexity between LTE and NR could be greater than 1000 times.

A UE is configured to transmit a channel state information (CSI) report with a certain periodicity or when triggered by the network. The CSI report includes information indicating the quality of a given channel at a specific time. Specifically, the CSI report includes the following parameters: a channel quality indicator (CQI), a precoding matrix indicator (PMI), a CSI-RS resource indicator (CRI), a synchronization signal (SS)/physical broadcast channel (PBCH) resource block indicator (SSBRI), a rank indicator (RI) and/or Layer-1 reference signal received power (L1-RSRP), and a layer indicator (LI). For CSI acquisition and beam management, the UE may be configured with a CSI report setting in RRC signaling, wherein the CSI report setting may contain a parameter (e.g., ReportQuantity) to indicate one or more CSI-related quantities to report in which component carrier (e.g., CRI, RI, PMI, CQI, L1-RSRP, etc.), as well as which uplink channel should be used to carry the reported CSI-related quantities (e.g., physical uplink shared channel (PUSCH), physical uplink control channel (PUCCH), etc.).

In generating a CSI report, there are a number of CSI processing criteria. The UE can indicate the number of supported simultaneous CSI calculations $N_{CPU}$. If a UE supports $N_{CPU}$ simultaneous CSI calculations, it is said to have $N_{CPU}$ CSI processing units (CPUs) for processing CSI reports across all configured cells. If L CPUs are occupied for calculation of CSI reports in a given OFDM symbol, the UE has $N_{CPU}$-L unoccupied CPUs. If N CSI reports start occupying their respective CPUs on the same OFDM symbol on which $N_{CPU}$-L CPUs are unoccupied, where each CSI report n=0, . . . , N−1 corresponds to $O_{CPU}^{(n)}$, the UE is not required to update the N−M requested CSI reports with lowest priority, where 0≤M≤N is the largest value such that $\Sigma_{n=0}^{M-1} O_{CPU}^{(n)} - N_{CPU} - L$ holds.

A UE is not expected to be configured with an aperiodic CSI trigger state containing more than $N_{CPU}$ reporting settings. Processing of a CSI report occupies a number of CPUs for a number of symbols. For example, $O_{CPU}=0$ for a CSI report with CSI-ReportConfig with higher layer parameter reportQuantity set to "none" and CSI-RS-ResourceSet with higher layer parameter trs-Info configured. Alternatively, $O_{CPU}=1$ for a CSI report with CSI-ReportConfig with higher layer parameter reportQuantity set to "cri-RSRP," "ssb-Index-RSRP," or "none" (and CSI-RS-ResourceSet with higher layer parameter trs-Info not configured). For a CSI report with CSI-ReportConfig with higher layer parameter reportQuantity set to "cri-RI-PMI-CQI," "cri-RI-il," "cri-RI-il-CQI," "cri-RI-CQI," or "cri-RI-LI-PMI-CQI," if a CSI report is aperiodically triggered without transmitting a PUSCH with either transport block or HARQ-ACK or both when L=0 CPUs are occupied, where the CSI corresponds to a single CSI with wideband frequency-granularity and at most four CSI-RS ports in a single resource without CRI reporting, and where codebookType is set to "type1-SinglePanel," or where reportQuantity is set to "cri-RI-CQI," $O_{CPU}=N_{CPU}$, otherwise, $O_{CPU}=K_s$, where $K_s$ is the number of CSI-RS resources in the CSI-RS resource set for channel measurement.

For a CSI report with CSI-ReportConfig with higher layer parameter reportQuantity set to "none" and CSI-RS-ResourceSet with higher layer parameter trs-Info not configured, the CPU(s) are occupied for a number of OFDM symbols according to various criteria. Specifically, a periodic or semi-persistent CSI report (excluding an initial semi-persistent CSI report on PUSCH after the physical downlink control channel (PDCCH) triggering the report) occupies CPU(s) from the first symbol of the earliest one of each transmission occasion of periodic or semi-persistent CSI-RS/SSB resources for channel measurements for L1-RSRP computation, until $Z_3'$ symbols after the last symbol of the latest one of the CSI-RS/SSB resource for channel measurement for L1-RSRP computation in each transmission occasion. An aperiodic CSI report occupies CPU(s) from the first symbol after the PDCCH triggering the CSI report until the last symbol between $Z_3$ symbols after the first symbol after the PDCCH triggering the CSI report and $Z_3$ symbols after the last symbol of the latest one of each CSI-RS/SSB resource for channel measurement for L1-RSRP computation.

In any slot, the UE is not expected to have more active CSI-RS ports or active CSI-RS resources than reported as a capability. Non-zero power (NZP) CSI-RS resources are active for a duration of time defined as follows. For aperiodic CSI-RS, the duration of time starts from the end of the PDCCH containing the request and ends at the end of the PUSCH containing the report associated with this aperiodic CSI-RS. For semi-persistent CSI-RS, the duration of time starts when the activation command is applied, and ends when the deactivation command is applied. For periodic CSI-RS, the duration of time starts when the periodic CSI-RS is configured by higher layer signaling, and ends when the periodic CSI-RS configuration is released. If a CSI-RS resource is referred by N CSI reporting settings, the CSI-RS resource and the CSI-RS ports within the CSI-RS resource are counted N times.

Having as a starting point the CSI processing framework described above, the present disclosure defines a positioning processing framework that includes a positioning processing unit (PPU) for reporting various positioning-related capabilities of the UE. Specifically, similar to a CPU, which indicates the number of simultaneous CSI calculations a UE can perform across all configured cells, the present disclosure introduces a PPU that indicates the number of simultaneous positioning calculations a UE can perform across all configured cells. Like a CSI report, a UE can report the number of PPUs it can support to the network on one or more PPUs. The network may provide a UE with a definition of a PPU (e.g., some number of simultaneous positioning calculations) and the UE may report the number of PPUs it can support based on that definition. Alternatively, the UE may report the number of PPUs it can support based on its own definition of a PPU. Note that "simultaneous" calculations mean that two or more calculations are being performed at least partially at the same time and/or at the same frequency. The calculations may start and/or end at different times and/or frequencies, but there is at least a portion of time/frequency at which they overlap. Said another way, a PPU indicates the number of positioning calculations that the UE can perform per unit of time, per unit of frequency, or both.

For positioning measurements and reporting, the proposed framework defines how to count the number of active PRS resources, to assign PPUs in different PRS resources/reports, and to limit the number of PPUs occupied. Regarding how to count the active PRS resources, as noted above, each PRS resource spans a set of REs. If there is a bound on the number of REs that the UE can process (e.g., simultaneously), the number of active PRS resources can effectively and implicitly be limited by this number. Regarding the assignment of PPUs in different PRS resources/reports, PPUs may be assigned to different PRS resources/reports according to the following parameters/characteristics, which are described further below: (1) the number of REs allocated to carry PRS (which is the number of PRS resources the UE needs to process and may be referred to as PRS overhead), (2) whether the position estimate is UE-assisted or UE-based, (3) which parameters are to be measured and/or reported, and (4) how quickly the calculations are to be performed (i.e., latency-based differentiation). Regarding limiting the number of PPUs occupied, this is accomplished by the UE signaling its capabilities for the foregoing characteristics/parameters.

Special considerations are made herein that are specific to positioning measurements and reporting to differentiate from the CSI processing approach described above. For example, report parameters may include a positioning reference indicator (PRI), RSRP, the difference between the reception of a downlink reference signal and the transmission of an uplink reference signal at the UE (i.e., the "UE Rx-Tx" measurement), RSTD, RSRP per path, multiple RSTDs, downlink AoA/zenith of arrival (ZoA).

The CSI framework described above is not for positioning. For example, there are many fewer REs for CSI processing (e.g., one to three REs per slot) than are needed for PRS processing (e.g., at least six REs per port). Typical PRS processing includes symbol processing, slot processing, occasion processing, and peak(s) detection. Symbol processing includes tone extraction, phase rotation, descrambling, and scaling. Slot processing includes tone-combining, de-staggering, and IFFT (depending on the corresponding report). Occasion processing includes coherent integration across consecutive slots. Peak(s) detection includes identifying the ToA(s) of the PRS.

Figure 11:
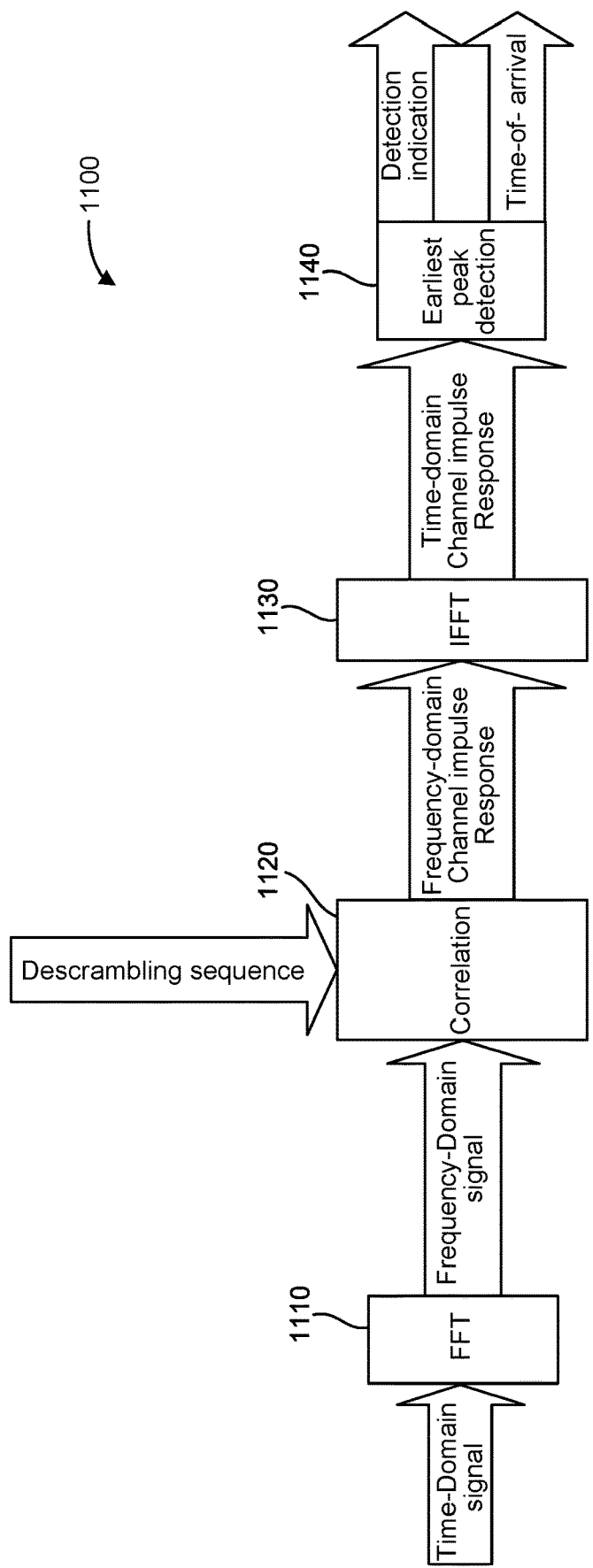
FIG. 11 is a diagram of an exemplary PRS processing method, according to various aspects of the disclosure.

FIG. 11 is a diagram of an exemplary PRS processing method 1100, according to various aspects of the disclosure. In order to identify the ToA of an RF signal (e.g., a PRS) the receiver (e.g., a UE) first jointly processes all the REs on the channel on which the transmitter (e.g., a base station) is transmitting the RF signal, and performs an inverse Fourier transform to convert the received RF signals to the time domain. The conversion of the received RF signals to the time domain is referred to as estimation of the channel energy response (CER) or channel impulse response (CIR). The CER shows the peaks on the channel over time, and the earliest "significant" peak should therefore correspond to the ToA of the RF signal. Generally, the receiver will use a noise-related quality threshold to filter out spurious local peaks, thereby presumably correctly identifying significant peaks on the channel. For example, the receiver may choose a ToA estimate that is the earliest local maximum of the CER that is at least X decibels (dB) higher than the median of the CER and a maximum Y dB lower than the main peak on the channel. The receiver determines the CER for each RF signal from each transmitter in order to determine the ToA of each RF signal from the different transmitters.

Thus, with reference to FIG. 11, at an FFT stage 1110, a UE (e.g., any of the UEs described herein) receives a time-domain RF signal and converts it to a frequency-domain signal. At a correlation stage 1120, the UE generates a frequency-domain channel impulse response from the frequency-domain signal based on a descrambling sequence. At an IFFT stage 1130, the UE generates a time-domain channel impulse response from the frequency-domain channel impulse response (also referred to as the channel energy response). At an earliest peak detection stage 1140, the UE generates a detection indication and a ToA of the time-domain RF signal received at the FFT stage 1110 based on the time-domain channel impulse response received from the IFFT stage 1130.

In an aspect, the UE may receive the time-domain RF signal at one or more of antennas 316. The subsequent stages (i.e., FFT stage 1110, correlation stage 1120, IFFT stage 1130, earliest peak detection stage 1140) may be performed by the corresponding one or more receivers 312, the WWAN transceiver 310, and/or the processing system 332, depending on the hardware implementation of the UE.

The time needed to perform PRS processing may depend on the parameters/characteristics noted above, specifically: (1) the number of REs allocated to carry PRS, (2) whether the position estimate is UE-assisted or UE-based, (3) which parameters are to be measured and/or reported, and (4) how quickly the calculations are to be performed. Note that "UE-assisted" means that another entity (e.g., location server 230, LMF 270, SLP 272) estimates the location of the UE based on measurements taken by the UE, and "UE-based" means that the UE estimates its own location.

In the proposed PPU framework, the UE can report to the network, as a positioning capability of the UE, the number of PPUs it can support/perform (and thereby the number of positioning calculations it can support/perform per unit of time/frequency). The number of PPUs a UE can perform may depend on various factors. For example, as noted above, the number of PPUs may be a function of the maximum number of REs the UE can process simultaneously for PRS resources. The number of REs can be defined per millisecond (e.g., a PPU may indicate that the UE can simultaneously process up to 1000 REs per millisecond across all PRS resources), per slot (e.g., a PPU may indicate that the UE can process up to 48 REs per slot), per occasion, per PRB, or per PRS bandwidth. In this scenario, because a PPU indicates the maximum number of REs a UE can process simultaneously, if the network configures the UE to process PRS on more REs than the UE is capable of, the UE will ignore the additional REs. For example, if the UE reports a PPU that indicates it can process six REs per PRB and a base station transmits PRS on more than six REs per PRB, the UE will ignore the additional REs and only process six.

In an aspect, the UE can report the number of PPUs it can support in a ProvideCapabilities LPP message, similar to the OTDOA-ProvideCapabilities LPP message. A field could be added that would depend on the definition of a PPU. For example, if a PPU depends on the number of REs/PRBs carrying PRS per slot, then a field such as NumberOfPPUs-PerSlot may be added that could take the values of '3' (e.g., 1-symbol comb-4), '6' (e.g., 1-symbol comb-2), '12' (e.g., 2-symbol comb-2), '24,' '48,' '72,' '144,' or '168' (e.g., 14 symbols comb 12).

Further, PPUs can be defined across all PRS resources in a single component carrier (across all base stations), or across all PRS resources across all component carriers (across all base stations). For example, if the UE indicates (via a PPU) that it can process up to 60 PRS REs on a single component carrier, but the PRS REs transmitted on that component carrier by one or more base stations total more than 60, the UE will ignore the additional PRS REs. Similarly, as another example, if the UE indicates (via a PPU) that it can process up to 60 PRS REs across all component carriers, but the PRS REs transmitted across all component carriers by one or more base stations is greater than 60, the UE will ignore PRS REs above the 60 that it can support.

A UE may explicitly indicate the number of PRS REs it can process simultaneously in a PPU, as described above, or may implicitly indicate the number of PRS REs. For example, rather than reporting the number of PRS REs it can support, the UE can report the number of symbols and comb-type per PRB that it can simultaneously process. The number of symbols reported is the number of consecutive symbols the UE is capable of processing, and the comb-type indicates the number of subcarriers within each symbol that the UE is capable of processing. For example, a comb-type of comb-4 means that the UE is capable of processing a PRS RE every fourth subcarrier of a given symbol.

Figure 12:
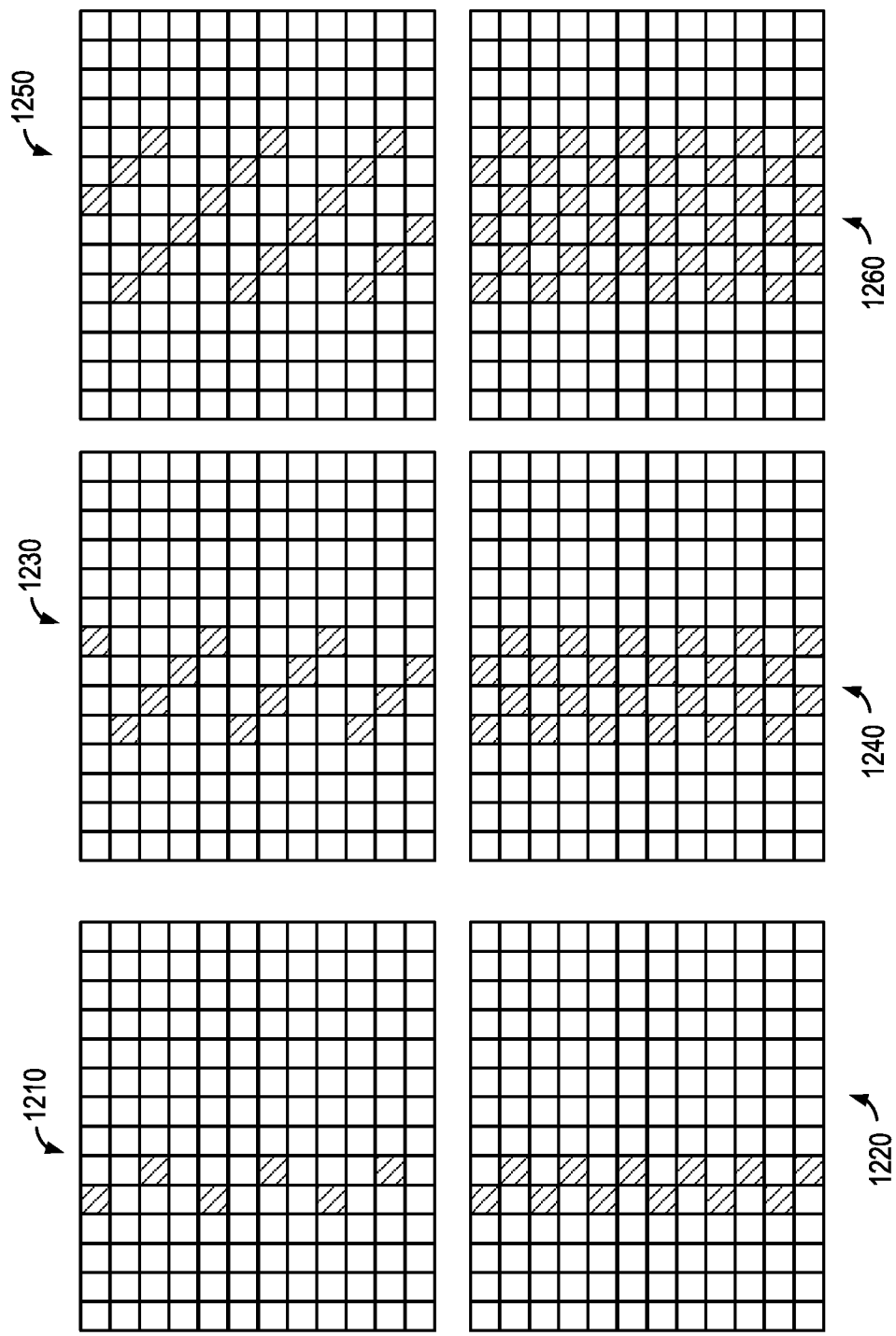
FIG. 12 illustrates various PRS resource configurations per physical resource block (PRB) that a UE may support, according to various aspects of the disclosure.

FIG. 12 illustrates various PRS resource configurations per PRB that a UE may support, according to aspects of the disclosure. Each exemplary PRS resource (e.g., transmit beam) configuration illustrated in FIG. 12 is a different combination of comb-type and number of symbols per PRB of the resource. The x-axis of each graph in FIG. 12 represents time, and the y-axis represents frequency. Each block of each PRB in FIG. 12 represents an RE. As discussed above, each RE is comprised of one symbol in the time domain and one subcarrier in the frequency domain.

As a first exemplary PRS configuration 1210, a UE may be capable of/configured to measure PRS transmitted on REs in two consecutive symbols with a comb-type of comb-4. As a second exemplary PRS configuration 1220, a UE may be capable of/configured to measure PRS transmitted on REs in two consecutive symbols, but with a comb-type of comb-2. As will be appreciated, the UE would need to have higher capabilities to measure the PRS configuration 1220 than to measure the PRS configuration 1210, as the UE will have to measure REs on twice as many subcarriers per symbol for PRS configuration 1220 as for PRS configuration 1210.

For a third exemplary PRS configuration 1230, PRS are transmitted and/or measured in REs over four consecutive symbols with a comb-type of comb-4. For a fourth exemplary PRS configuration 1240, PRS are transmitted and/or measured in REs over four consecutive symbols with a comb-type of comb-2. Again, as will be appreciated, the UE would need to have higher capabilities to measure the PRS configuration 1240 than to measure the PRS configuration 1230, as the UE will have to measure REs on twice as many subcarriers per symbol for PRS configuration 1240 as for PRS configuration 1230. In addition, the UE would need to have higher capabilities to measure the PRS configurations 1230 and 1240 than to measure the PRS configurations 1210 and 1220, as the UE will have to measure REs on twice as many symbols for PRS configurations 1230 and 1240 as for PRS configurations 1210 and 1220.

For a fifth exemplary PRS configuration 1250, PRS are transmitted and/or measured in REs over six consecutive symbols with a comb-type of comb-4. For a sixth exemplary PRS configuration 1260, PRS are transmitted and/or measured in REs over six consecutive symbols with a comb-type of comb-2. Again, as will be appreciated, the UE would need to have higher capabilities to measure the PRS configuration 1260 than to measure the PRS configuration 1250, as the UE will have to measure REs on twice as many subcarriers per symbol for PRS configuration 1260 as for PRS configuration 1250.

As a further example, where PPUs do not depend on the configured bandwidth, the UE may dedicate one PPU for PRS REs across two symbols with comb-2 (e.g., PRS configuration 1220), or across four symbols with comb-4 (e.g., PRS configuration 1230), or across six symbols with comb-6. In the case of one PPU for PRS REs across two symbols with comb-2, the UE may dedicate two PPUs for PRS REs on four symbols with comb-2 (i.e., double the number of PRS REs on two symbols with comb-2). In the case of one PPU for PRS REs across four symbols with comb-4, the UE may dedicate two PPUs for PRS REs on six symbols with comb-4 (i.e., approximately double the number of PRS REs on four symbols with comb-4). In this case, the field may be called NumberOfPPUs in an LPP ProvideCapabilities message, and could take the values of 1, 2, 4, 6, 12, 24, 36, or 72, which would allow it to have up to 12 six-symbol-comb-6 configurations (each one counts as six PPUs, and 6*12=72).

As another example, where PPUs do not depend on the configured bandwidth, the UE may dedicate one PPU for PRS REs across two symbols with comb-2 (e.g., PRS configuration 1220), or across four symbols with comb-4 (e.g., PRS configuration 1230), or across six symbols with comb-6 for every 10 MHz of configured PRS resource bandwidth or processed PRS resource bandwidth. In the case of one PPU for PRS REs across two symbols with comb-2, the UE may dedicate two PPUs for PRS REs on four symbols with comb-2 (i.e., double the number of PRS REs on two symbols with comb-2) for configured PRS resource bandwidth for every 10 MHz of configured PRS resources or processed PRS resource bandwidth (e.g., 100 MHz). In the case of one PPU for PRS REs across four symbols with comb-4, the UE may dedicate two PPUs for PRS REs on six symbols with comb-4 (i.e., approximately double the number of PRS REs on four symbols with comb-4) for configured PRS resource bandwidth for every 10 MHz of configured PRS resources or processed PRS resource bandwidth. That is, a PPU may define the number of PRS REs a UE can simultaneously process for X (e.g., 10) MHz of the total PRS bandwidth. The UE will ignore PRS REs outside of the specified bandwidth.

As will be appreciated, the fewer PRS REs a UE can process, and/or the smaller the bandwidth within which a UE can process PRS REs, the lower the positioning performance of the UE. Conversely, the more PRS REs a UE can process, and/or the greater the bandwidth within which a UE can process PRS REs, the better the positioning performance of the UE.

In an aspect, the number of PRS REs that a UE can simultaneously process, as indicated by a PPU, may also depend on whether the location estimate is UE-assisted or UE-based. A UE-based location estimate is far more measurement/calculation intensive for the UE than a UE-assisted location estimate. As such, the reported PPUs may specify different quantities depending on whether the location estimate is UE-assisted or UE-based. For example, the UE may report that for UE-assisted location estimates, it can process PRBs with PRS REs in six symbols with comb-2, whereas for UE-based location estimates, it can only process PRBs with PRS REs in two symbols with comb-2. In an aspect, to signal such capability, there may be two NumberOfPPUs fields in an LPP ProvideCapabilities message, one for UE-based and one for UE-assisted positioning.

In an aspect, the number of PRS REs indicated in a PPU may depend on what the measured/reported parameter is for UE-assisted positioning. For example, reporting only the L1-RSRP would be lower than or equal in complexity to reporting only timing information (e.g., RSTD, UE Rx-Tx) for the main peak of the channel impulse response, which would be lower than or equal to reporting both the L1-RSRP and timing information (e.g., RSTD, UE Rx-Tx) for the main peak, which would be lower than or equal to reporting timing information for more than one peak, which would lower than or equal to reporting L1-RSRP and timing information (e.g., RSTD, UE Rx-Tx) for more than one peak. The greater the complexity, the fewer PRS REs a UE may have the capability to process for a given measurement.

For example, if a UE is configured to measure/report RSTD over 10 PRS resources (e.g., transmit beams), each PRS resource may require two PPUs, whereas, due to the lower complexity of L1-RSRP, if the 10 PRS resources are used only for L1-RSRP reporting, each PRS resource may need only one PPU. As another example, if a UE is configured to report RSTD, it may be able to process 20 PRS resources (e.g., 20 transmit beams) within a slot/millisecond/subframe/etc., whereas if it is configured to report L1-RSRP, it may be able to process 10 PRS resources within a slot/millisecond/occasion/etc., whereas again, if it is configured to report the RSTD of multiple peaks, it may only be able to process four PRS resources within a slot/millisecond/occasion/etc.

In an aspect, the positioning capability, or assignment of PPUs, may also depend on the requested accuracy (if any) of the location estimate (for UE-based positioning). For example, if the network (e.g., the serving base station, the location server) requests a highly accurate location estimate, it would be expected that the base station would configure many PRS resources (e.g., multiple transmit beams carrying PRS), and the UE would be expected to process a significant portion of them. However, if the requested accuracy is low, even if the base station configures many PRS resources, the UE would simply not process them, so the PPU requirement would be lower. The positioning processing capability, or assignment of PPUs, could be signaled in a NumberOfPPUs field for different levels of accuracies. In that case, an LPP ProvideCapabilities message may contain multiple such fields (e.g., NumberOfPPUsLowAccuracy, NumberOfPPUsHighAccuracy) and the UE would report both.

In an aspect, the positioning processing capability, or assignment of PPUs, may also depend on the frequency band in which the PRS are transmitted, or the frequency band in the band combination, or the frequency range (FR). For example, there may be up to 128 beams in FR2, whereas there may be up to only eight in FR1 TDD. As such, the UE may not be able to process as many PRS resources in FR2 as in FR1 TDD. In this case, the NumberOfPPUs field could be a sequence of values, each one corresponding to a different FR or band or band-in-band combination.

In an aspect, the positioning processing capability, or assignment of PPUs, may also depend on the required latency between the latest PRS occasion and the reporting of the positioning measurements (in UE-assisted mode) or the UE location (in UE-based mode). For example, the UE may only be expected to report updated RSTD/UE Rx-Tx/L1-RSRP values using the PRS occasion ending on symbol/slot "X," if the report is being sent on a PUSCH that is at least X+n away (where n is some number of symbols/slots). For different reporting parameters, n may be different. For example, reporting the UE's location may require more processing time (e.g., n=10) than reporting only RSTD or L1-RSRP (e.g., n=5) measurements. In this case, there may be a NumberOfPPUs field for different latency reporting.

Figure 13:
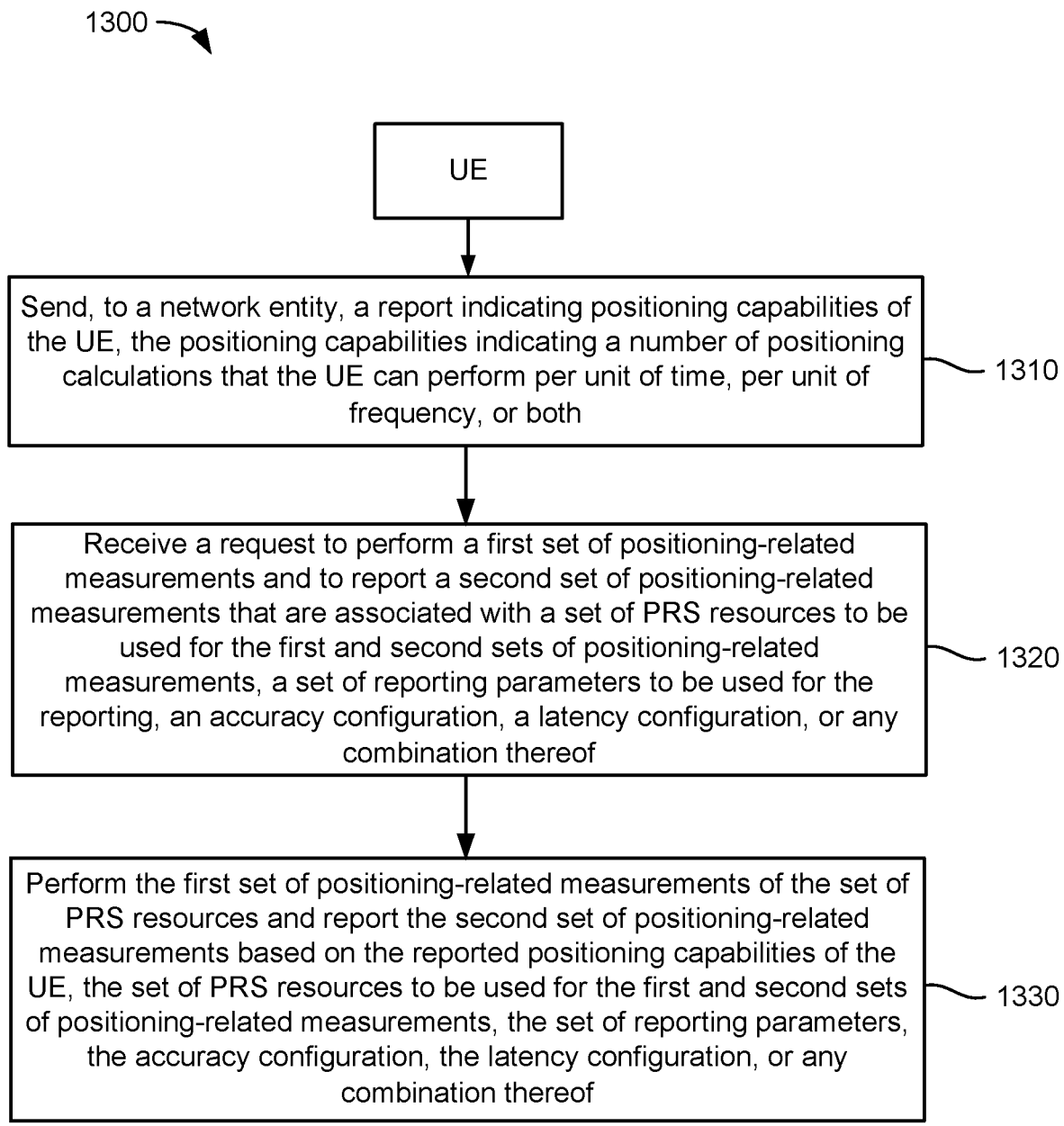
FIG. 13 illustrates an exemplary method of wireless communication, according to various aspects of the disclosure.

FIG. 13 illustrates an exemplary method 1300 of wireless communication, according to various aspects of the disclosure. The method 1300 may be performed by a UE (e.g., any of the UEs described herein).

At 1310, the UE sends, to a network entity (e.g., a (serving) base station/TRP/cell, a location server, such as location server 230, LMF 270, SLP 272), a report indicating positioning capabilities of the UE, the positioning capabilities indicating a number of positioning calculations that the UE can perform per unit of time, per unit of frequency, or both (i.e., the number of PPUs the UE can support). In an aspect, operation 1310 may be performed by the WWAN transceiver 310, the processing system 332, the memory component 340, and/or PPU manager 342, any or all of which may be considered means for performing this operation.

At 1320, the UE receives a request to perform a first set of positioning-related measurements and to report a second set of positioning-related measurements that are associated with a set of PRS resources to be used for the first and second sets of positioning-related measurements, a set of reporting parameters to be used for the reporting, an accuracy configuration, a latency configuration, or any combination thereof. In an aspect, operation 1320 may be performed by the WWAN transceiver 310, the processing system 332, the memory component 340, and/or PPU manager 342, any or all of which may be considered means for performing this operation.

At 1330, the UE performs the first set of positioning-related measurements of the set of PRS resources and reports the second set of positioning-related measurements based on the reported positioning capabilities of the UE, the set of PRS resources to be used for the first and second sets of positioning-related measurements, the set of reporting parameters, the accuracy configuration, the latency configuration, or any combination thereof. In an aspect, operation 1330 may be performed by the WWAN transceiver 310, the processing system 332, the memory component 340, and/or PPU manager 342, any or all of which may be considered means for performing this operation.

In an aspect, the set of reporting parameters may include an RSRP parameter, a UE Rx-Tx measurement, a ToA, an RSTD parameter, a location of the UE, a reception angle, PRS resource identifiers, PRS resource set identifiers, timestamps during which the second set of positioning-related measurements are valid, or any combination thereof. The first set of positioning-related measurements may include the RSRP parameter, the UE Rx-Tx measurement, the ToA, the RSTD parameter, the location of the UE, the reception angle, the PRS resource identifiers, the PRS resource set identifiers, the timestamps during which the second set of positioning-related measurements are valid, or any combination thereof. The second set of positioning-related measurements may include the RSRP parameter, the UE Rx-Tx measurement, the ToA, the RSTD parameter, the location of the UE, the reception angle, the PRS resource identifiers, the PRS resource set identifiers, the timestamps during which the second set of positioning-related measurements are valid, or any combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
    sending, to a network entity, a report indicating positioning capabilities of the UE, the positioning capabilities indicating a number of positioning calculations that the UE can perform per unit of time, per unit of frequency, or both;
    receiving a request to perform a first set of positioning-related measurements and to report a second set of positioning-related measurements that are associated with a set of positioning reference signal (PRS) resources to be used for the first and second sets of positioning-related measurements, a set of reporting parameters to be used for the reporting, an accuracy configuration, a latency configuration, or any combination thereof; and
    performing the first set of positioning-related measurements of the set of PRS resources and reporting the second set of positioning-related measurements based on the reported positioning capabilities of the UE, the set of PRS resources to be used for the first and second sets of positioning-related measurements, the set of reporting parameters, the accuracy configuration, the latency configuration, or any combination thereof.

2. The method of claim 1, wherein the number of positioning calculations are represented in the report as a number of positioning processing units (PPUs) that the UE supports, a PPU indicating a number of resource elements (REs) dedicated for PRS resources per unit of time, frequency, or both that the UE can process per unit of time, per unit of frequency, or both.

3. The method of claim 2, further comprising:
    receiving, from the network entity, a definition of the PPU, the definition of the PPU indicating the number of REs per unit of time, frequency, or both; and
    determining the number of PPUs that the UE supports based on the definition of the PPU.

4. The method of claim 1, wherein the unit of time comprises one or more milliseconds, one or more frames, one or more subframes, one or more slots, one or more positioning occasions, or one or more symbols, and wherein the unit of frequency comprises one or more physical resource blocks (PRBs), or a portion of bandwidth used for positioning.

5. The method of claim 1, wherein the number of positioning calculations is represented in the report as a number of symbols per unit of time during which the UE is configured to measure PRS.

6. The method of claim 1, wherein the set of PRS resources comprises one or more transmit beams transmitted by a serving transmission-reception point (TRP) or one or more neighboring TRPs.

7. The method of claim 1, wherein the number of positioning calculations is across all PRS resources for all TRPs operating on a given frequency layer.

8. The method of claim 1, wherein the number of positioning calculations is for all PRS resources for all TRPs operating on all frequency layers supported by the UE.

9. The method of claim 1, wherein the number of positioning calculations is determined based on whether the UE is expected to report the second set of positioning-related measurements to assist the network entity to estimate a location of the UE, or based on whether the UE estimates the location of the UE.

10. The method of claim 9, wherein, based on the UE assisting the network entity to estimate the location of the UE, the number of positioning calculations is determined based on a requested latency between a last PRS occasion and the UE sending the second set of positioning-related measurements.

11. The method of claim 9, wherein, based on the UE estimating a location of the UE, the number of positioning calculations is determined based on a requested latency between a last PRS occasion and the UE sending the location of the UE.

12. The method of claim 1, wherein the number of positioning calculations is determined based on a requested accuracy of a location estimate of the UE.

13. The method of claim 12, wherein the number of positioning calculations is determined based on the requested accuracy based on the UE performing the location estimate.

14. The method of claim 1, wherein the number of positioning calculations is determined based on a bandwidth, band, or frequency range in which the set of PRS resources are transmitted.

15. The method of claim 1, wherein the UE reports updated values for the set of reporting parameters using a PRS resource ending on a given symbol or slot based on the updated values being transmitted at least a threshold number of symbols or slots after the given symbol or slot.

16. The method of claim 1, wherein the UE sends the report periodically or upon request from the network entity.

17. The method of claim 1, wherein a number of the set of PRS resources is based on what parameters are includes in the set of reporting parameters.

18. The method of claim 17, wherein:
the set of reporting parameters comprises a reference signal received power (RSRP) parameter, a UE reception-to-transmission (UE Rx-Tx) measurement, a time of arrival (ToA), a reference signal time difference (RSTD) parameter, a location of the UE, a reception angle, PRS resource identifiers, PRS resource set identifiers, timestamps during which the second set of positioning-related measurements are valid, or any combination thereof,
the first set of positioning-related measurements comprises the RSRP parameter, the UE Rx-Tx measurement, the ToA, the RSTD parameter, the location of the UE, the reception angle, the PRS resource identifiers, the PRS resource set identifiers, the timestamps during which the second set of positioning-related measurements are valid, or any combination thereof, and
the second set of positioning-related measurements comprises the RSRP parameter, the UE Rx-Tx measurement, the ToA, the RSTD parameter, the location of the UE, the reception angle, the PRS resource identifiers, the PRS resource set identifiers, the timestamps during which the second set of positioning-related measurements are valid, or any combination thereof.

19. The method of claim 18, wherein the first set of positioning-related measurements comprises the RSTD parameter and the second set of positioning-related measurements comprises the location of the UE.

20. The method of claim 18, wherein the first set of positioning-related measurements comprises the RSTD parameter and the reception angle and the second set of positioning-related measurements comprises the RSTD parameter, the reception angle, or both.

21. The method of claim 18, wherein the first set of positioning-related measurements comprises the RSTD parameter and the second set of positioning-related measurements comprises a PRS resource ID that corresponds to an earliest path from a TRP.

22. The method of claim 18, wherein the first set of positioning-related measurements are the same as the second set of positioning-related measurements.

23. The method of claim 18, wherein:
reporting the RSRP parameter is lower than or equal in complexity to reporting the RSTD parameter or the UE RX-Tx measurement for a main peak of a channel on which the set of PRS resources is transmitted,
reporting the RSTD parameter and the UE Rx-TX measurement for the main peak is lower than or equal in complexity to reporting the RSRP parameter, the RSTD parameter, and the UE Rx-Tx measurement for the main peak, and
reporting the RSRP parameter, the RSTD parameter, and the UE Rx-Tx measurement is lower than or equal in complexity to reporting the RSRP parameter, the RSTD parameter, and the UE Rx-Tx measurement for more than the main peak.

24. A user equipment (UE), comprising:
a memory;
at least one transceiver; and
at least one processor communicatively coupled to the memory and the at least one transceiver, the at least one processor configured to:
cause the at least one transceiver to transmit, to a network entity, a report indicating positioning capabilities of the UE, the positioning capabilities indicating a number of positioning calculations that the UE can perform per unit of time, per unit of frequency, or both;
receive, via the at least one transceiver, a request to perform a first set of positioning-related measurements and to report a second set of positioning-related measurements that are associated with a set of positioning reference signal (PRS) resources to be used for the first and second sets of positioning-related measurements, a set of reporting parameters to be used for the reporting, an accuracy configuration, a latency configuration, or any combination thereof; and
perform the first set of positioning-related measurements of the set of PRS resources and report the second set of positioning-related measurements based on the reported positioning capabilities of the UE, the set of PRS resources to be used for the first and second sets of positioning-related measurements, the set of reporting parameters, the accuracy configuration, the latency configuration, or any combination thereof.

25. The UE of claim 24, wherein the number of positioning calculations are represented in the report as a number of positioning processing units (PPUs) that the UE supports, a PPU indicating a number of resource elements (REs) dedicated for PRS resources per unit of time, frequency, or both that the UE can process per unit of time, per unit of frequency, or both.

26. The UE of claim 25, wherein the at least one processor is further configured to:
receive, from the network entity via the at least one transceiver, a definition of the PPU, the definition of the PPU indicating the number of REs per unit of time, frequency, or both; and
determine the number of PPUs that the UE supports based on the definition of the PPU.

27. The UE of claim 24, wherein the unit of time comprises one or more milliseconds, one or more frames, one or more subframes, one or more slots, one or more positioning occasions, or one or more symbols, and wherein the unit of frequency comprises one or more physical resource blocks (PRBs), or a portion of bandwidth used for positioning.

28. The UE of claim 24, wherein the number of positioning calculations is represented in the report as a number of symbols per unit of time during which the UE is configured to measure PRS.

29. The UE of claim 24, wherein the set of PRS resources comprises one or more transmit beams transmitted by a serving transmission-reception point (TRP) or one or more neighboring TRPs.

30. The UE of claim 24, wherein the number of positioning calculations is across all PRS resources for all TRPs operating on a given frequency layer.

31. The UE of claim 24, wherein the number of positioning calculations is for all PRS resources for all TRPs operating on all frequency layers supported by the UE.

32. The UE of claim 24, wherein the number of positioning calculations is determined based on whether the UE is expected to report the second set of positioning-related measurements to assist the network entity to estimate a location of the UE, or based on whether the UE is configured to estimate the location of the UE.

33. The UE of claim 32, wherein, based on the UE being configured to assist the network entity to estimate the location of the UE, the number of positioning calculations is determined based on a requested latency between a last PRS occasion and the at least one processor being configured to cause the at least one transceiver to transmit the second set of positioning-related measurements.

34. The UE of claim 32, wherein, based on the UE being configured to estimate a location of the UE, the number of positioning calculations is determined based on a requested latency between a last PRS occasion and the at least one processor being configured to cause the at least one transceiver to transmit the location of the UE.

35. The UE of claim 24, wherein the number of positioning calculations is determined based on a requested accuracy of a location estimate of the UE.

36. The UE of claim 35, wherein the number of positioning calculations is determined based on the requested accuracy based on the UE being configured to perform the location estimate.

37. The UE of claim 24, wherein the number of positioning calculations is determined based on a bandwidth, band, or frequency range in which the set of PRS resources are transmitted.

38. The UE of claim 24, wherein the at least one processor is configured to cause the at least one transceiver to report updated values for the set of reporting parameters using a PRS resource ending on a given symbol or slot based on the updated values being transmitted at least a threshold number of symbols or slots after the given symbol or slot.

39. The UE of claim 24, wherein the at least one processor is configured to cause the at least one transceiver to transmit the report periodically or upon request from the network entity.

40. The UE of claim 24, wherein a number of the set of PRS resources is based on what parameters are includes in the set of reporting parameters.

41. The UE of claim 40, wherein:
the set of reporting parameters comprises a reference signal received power (RSRP) parameter, a UE reception-to-transmission (UE Rx-Tx) measurement, a time of arrival (ToA), a reference signal time difference (RSTD) parameter, a location of the UE, a reception angle, PRS resource identifiers, PRS resource set identifiers, timestamps during which the second set of positioning-related measurements are valid, or any combination thereof,
the first set of positioning-related measurements comprises the RSRP parameter, the UE Rx-Tx measurement, the ToA, the RSTD parameter, the location of the UE, the reception angle, the PRS resource identifiers, the PRS resource set identifiers, the timestamps during which the second set of positioning-related measurements are valid, or any combination thereof, and
the second set of positioning-related measurements comprises the RSRP parameter, the UE Rx-Tx measurement, the ToA, the RSTD parameter, the location of the UE, the reception angle, the PRS resource identifiers, the PRS resource set identifiers, the timestamps during which the second set of positioning-related measurements are valid, or any combination thereof.

42. The UE of claim 41, wherein the first set of positioning-related measurements comprises the RSTD parameter and the second set of positioning-related measurements comprises the location of the UE.

43. The UE of claim 41, wherein the first set of positioning-related measurements comprises the RSTD parameter and the reception angle and the second set of positioning-related measurements comprises the RSTD parameter, the reception angle, or both.

44. The UE of claim 41, wherein the first set of positioning-related measurements comprises the RSTD parameter and the second set of positioning-related measurements comprises a PRS resource ID that corresponds to an earliest path from a TRP.

45. The UE of claim 41, wherein the first set of positioning-related measurements are the same as the second set of positioning-related measurements.

46. The UE of claim 41, wherein:
reporting the RSRP parameter is lower than or equal in complexity to reporting the RSTD parameter or the UE RX-Tx measurement for a main peak of a channel on which the set of PRS resources is transmitted,
reporting the RSTD parameter and the UE Rx-TX measurement for the main peak is lower than or equal in complexity to reporting the RSRP parameter, the RSTD parameter, and the UE Rx-Tx measurement for the main peak, and
reporting the RSRP parameter, the RSTD parameter, and the UE Rx-Tx measurement is lower than or equal in complexity to reporting the RSRP parameter, the RSTD parameter, and the UE Rx-Tx measurement for more than the main peak.

47. A user equipment (UE), comprising:
means for sending, to a network entity, a report indicating positioning capabilities of the UE, the positioning capabilities indicating a number of positioning calculations that the UE can perform per unit of time, per unit of frequency, or both;
means for receiving a request to perform a first set of positioning-related measurements and to report a second set of positioning-related measurements that are associated with a set of positioning reference signal (PRS) resources to be used for the first and second sets of positioning-related measurements, a set of reporting parameters to be used for the reporting, an accuracy configuration, a latency configuration, or any combination thereof; and
means for performing the first set of positioning-related measurements of the set of PRS resources and reporting the second set of positioning-related measurements based on the reported positioning capabilities of the UE, the set of PRS resources to be used for the first and second sets of positioning-related measurements, the set of reporting parameters, the accuracy configuration, the latency configuration, or any combination thereof.

48. A non-transitory computer-readable medium storing computer-executable instructions, the computer-executable instructions comprising:
- at least one instruction instructing a user equipment (UE) to send, to a network entity, a report indicating positioning capabilities of the UE, the positioning capabilities indicating a number of positioning calculations that the UE can perform per unit of time, per unit of frequency, or both;
- at least one instruction instructing the UE to receive a request to perform a first set of positioning-related measurements and to report a second set of positioning-related measurements that are associated with a set of positioning reference signal (PRS) resources to be used for the first and second sets of positioning-related measurements, a set of reporting parameters to be used for the reporting, an accuracy configuration, a latency configuration, or any combination thereof; and
- at least one instruction instructing the UE to perform the first set of positioning-related measurements of the set of PRS resources and report the second set of positioning-related measurements based on the reported positioning capabilities of the UE, the set of PRS resources to be used for the first and second sets of positioning-related measurements, the set of reporting parameters, the accuracy configuration, the latency configuration, or any combination thereof.

\* \* \* \* \*